United States Patent [19]

Letosky

[11] 3,775,672

[45] Nov. 27, 1973

[54] INTERNAL COMBUSTION ENGINE IGNITION TIMING INSTRUMENT

[75] Inventor: Vincent H. Letosky, Rochester, Mich.

[73] Assignee: General Motors Corporation, Detroit, Mich.

[22] Filed: Sept. 25, 1972

[21] Appl. No.: 291,793

[52] U.S. Cl. ............................... 324/16 R, 73/118
[51] Int. Cl. ............................................. F02p 17/00
[58] Field of Search ............... 324/15, 16, 19, 16 T; 73/116–119

[56] References Cited
UNITED STATES PATENTS

| | | | |
|---|---|---|---|
| 2,863,114 | 12/1958 | Murphy | 324/16 T |
| 3,485,093 | 12/1969 | Muller | 324/16 T |
| 3,630,076 | 12/1971 | Staudt | 324/15 |

*Primary Examiner*—Michael J. Lynch
*Attorney*—Eugene W. Christen et al.

[57] ABSTRACT

Circuitry responsive to a TDC signal, produced when the reference cylinder of the engine is at the top dead center position, and an ignition signal, produced when an ignition spark potential is generated for the reference cylinder, produces a series of timing angle signal pulses of a width proportional to the period between the TDC and ignition signals. An averaging circuit produces a timing angle potential signal of a magnitude proportional to the width of the timing angle signal pulses and of a polarity which indicates whether the ignition spark is retarded or advanced. The timing angle potential signal is applied to a digital voltmeter which indicates directly in degrees the ignition spark retard or advance and is compared with timing angle high and low reference potentials, of respective magnitudes above and below the magnitude of the timing angle potential signal at the selected number of degrees of ignition spark advance or retard, in respective comparator circuits which produce respective output signals indicating whether the ignition spark is retarded or advanced from or occurs at a selected timing angle.

10 Claims, 11 Drawing Figures

INTERNAL COMBUSTION ENGINE IGNITION TIMING INSTRUMENT

The subject invention is directed to an internal combustion engine ignition timing instrument.

To provide for the timing of the ignition spark of an internal combustion engine, a timing mark is located upon the engine flywheel or any other rotating part which revolves at engine crankshaft speed which, when aligned with an adjacent mark upon a stationary member of the engine, indicates that the reference cylinder is at the top dead center position. By use of a stroboscopic light which illuminates the timing mark and the adjacent mark when the spark plug of the reference cylinder is fired and noting the position of the timing mark relative to the stationary mark, the distributor may be revolved to provide the desired number of degrees of ignition spark retard or advance. This prior art method has proved to be inaccurate, consequently, an internal combustion engine ignition timing instrument which precisely times the engine ignition spark at the selected number of degrees of retard or advance is desirable.

It is, therefore, an object of this invention to provide an improved internal combustion engine ignition timing instrument.

It is another object of this invention to provide an improved internal combustion engine ignition timing instrument which provides for the direct readout in degrees on a digital voltmeter the ignition spark advance or retard.

It is an additional object of this invention to provide an improved internal combustion engine ignition timing instrument which provides for the direct readout in degrees on a digital voltmeter the ignition spark advance or retard and which also provides output signals which indicate whether the ignition spark is retarded or advanced from or occurs at a selected timing angle.

In accordance with this invention, an internal combustion engine ignition timing instrument is provided which produces a direct current timing angle potential signal of a magnitude proportional to the period between a TDC signal, produced when a reference cylinder of the engine is at the top dead center position, and an ignition signal, produced when an ignition spark potential is generated for a reference cylinder, and of a polarity which indicates whether the ignition spark is retarded or advanced which may be directly read out in degrees of ignition spark advance or retard on a digital voltmeter or may be compared with direct current reference potentials to produce output signals indicating whether the ignition spark is advanced or retarded from or occurs at a selected timing angle.

For a better understanding of the present invention, together with additional objects, advantages and features thereof, reference is made to the following description and accompanying drawings in which:

FIG. 1 schematically sets forth that portion of the circuit of this invention which produces a signal at the time the reference cylinder of the engine is at the top dead center position and a signal at the time of the generation of each ignition spark potential;

FIG. 2 schematically sets forth that portion of the circuit of this invention which provides signal pulses of a width proportional to the period between the signals produced by the circuitry of FIG. 1;

FIG. 3 schematically sets forth that portion of the circuit of this invention which provides respective potential level signals of a magnitude proportional to the frequency of the signals produced by the circuitry of FIG. 1;

FIG. 4 schematically sets forth that portion of the circuit of this invention which provides a potential signal of a magnitude proportional to the width of the signals produced by the circuit of FIG. 2;

FIG. 5 schematically sets forth the routing logic circuitry responsive to the signals produced by the circuitry of FIGS. 3 and 4 to illuminate indicator lamps which indicate the engine conditions of speed and ignition spark advance or retard;

Figure 10:
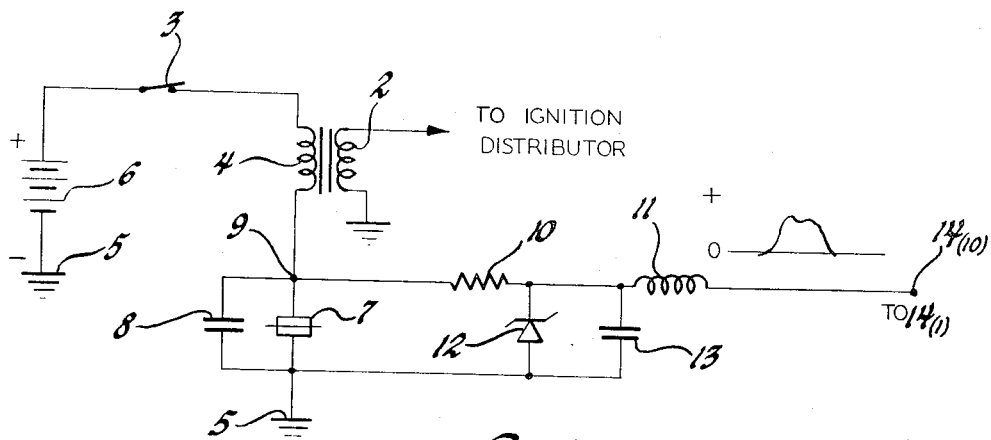
Figure 11:
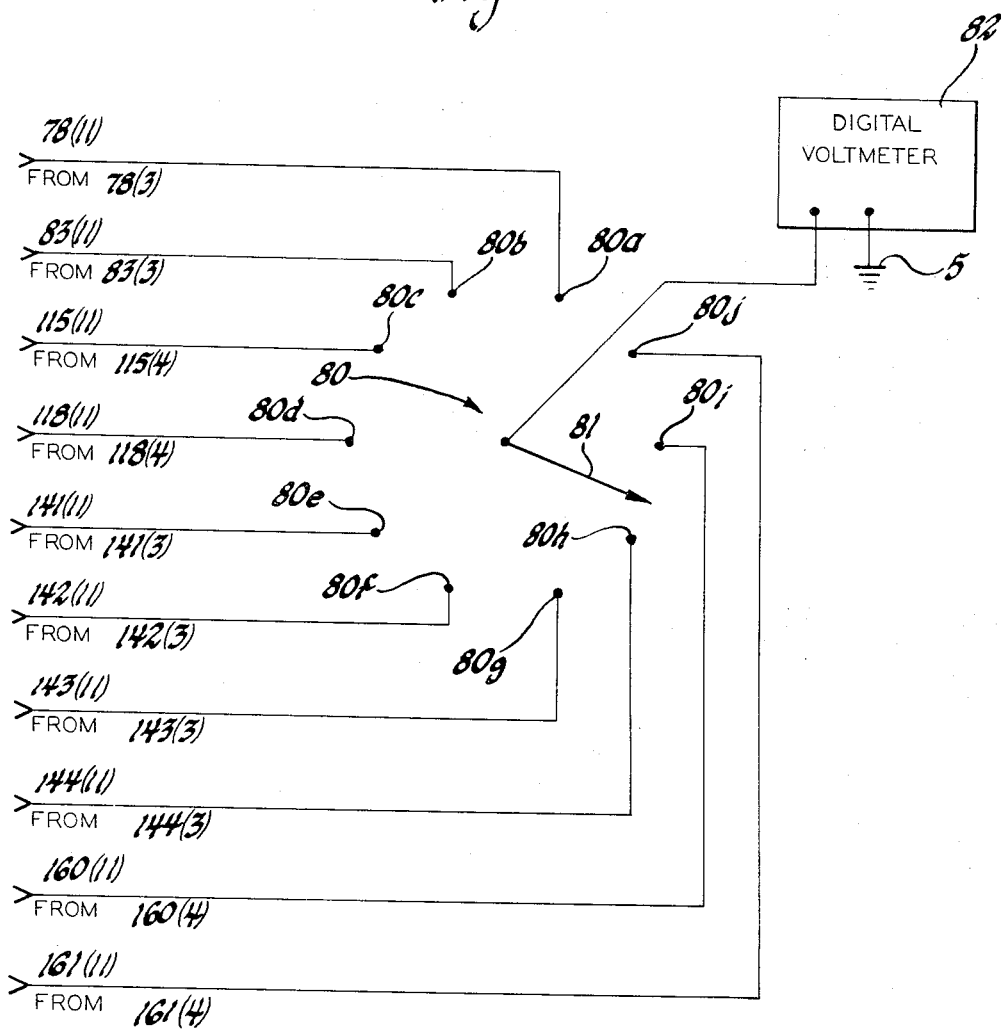

FIG. 10 schematically sets forth a circuit suitable for obtaining the signals which indicate that the engine has produced an ignition spark potential; and FIG. 11 schematically sets forth a switching system for supplying various potential signals to a conventional digital voltmeter.

As the point of reference or ground potential is the same point electrically throughout the system it has been represented in the drawing by the accepted schematic symbol and referenced by the numeral 5.

To supply the direct current operating potential to the circuit of this invention, conventional commercially available direct current power supplies may be employed. For this reason, and in the interest of reducing drawing complexity, the direct current power supplies have not been shown in the drawings. Each point in the circuit which is connected to a direct current power supply is labeled plus or minus to indicate the terminal of the direct current power supply to which it is connected.

The circuit of this invention employs one input, two input, and three input NAND gates of the type which are commercially available logic circuit elements well known in the art. A one input NAND gate inverts "High" or logic 1 input signal to a "Low" or logic 0 signal upon the output terminal. The two and three input NAND gates produce a "Low" or logic 0 signal upon the output terminal with a "High" or logic 1 signal upon all input terminals and a "High" or logic 1 signal upon the output terminal with a "Low" or logic 0 signal upon any input terminal, as is well known in the art.

In accordance with logic terminology well known in the art, throughout this specification logic signals will be referred to as being in the "High" or logic 1 state or in the "Low" or logic 0 state. For purposes of this specification, and without intention or inference of a limitation thereto, the "High" or logic 1 signals will be considered to be of a positive polarity potential and the "Low" or logic 0 signals will be considered to be of zero or ground potential.

The internal combustion engine ignition timing instrument of this invention produces a direct current potential level signal, hereinafter referred to as the "timing angle potential signal," of a magnitude proportional to the time between the occurrence of a direct current potential level signal which indicates that a reference cylinder of the engine is at top dead center position, hereinafter referred to as the "TDC signal", and another direct current potential level signal which indicates that the engine ignition system has produced an ignition spark potential for the reference cylinder, hereinafter referred to as the "ignition signal," and of a polarity which indicates whether the ignition signal appeared prior or subsequent to the TDC signal. The timing angle potential signal may be directly read out in degrees of ignition spark advance or retard on a digital voltmeter previously calibrated for 1 volt per degree and/or may be compared with a direct current reference signal of a magnitude equal to that of the ignition signal at the selected number of degrees of ignition spark advance or retard at a predetermined engine speed to produce output signals which illuminate respective electric lamps which indicate whether the ignition spark occurs at a point more advanced or more retarded than the selected number of degrees or at a point at the selected number of degrees.

As is well known in the automotive art, a harmonic balancer, which is a drum of magnetic material, is mounted upon the engine crankshaft externally of the crankcase and is provided with an axial timing mark which, when aligned with a pointer device secured to the engine, indicates that the reference cylinder is at the top dead center position. A magnetic probe having a pick-up coil may be mounted upon the engine in close proximity to the harmonic balancer. Each time the axial timing mark passes the probe, an alternating current probe signal is produced in the pick-up coil, as indicated by curve A of FIG. 6. A probe satisfactory for this application is commercially available from Electroproducts Laboratories, Inc.

Also, as is well known in the automotive art, the primary winding of the ignition coil is connected across the battery through a set of ignition distributor breaker contacts which are operated open and closed in timed relationship with the engine by the distributor rotor. Referring to FIG. 10, with ignition switch 3 closed, primary winding 4 of the ignition coil is connected to the positive polarity terminal of battery 6 through ignition switch 3 and to the negative polarity terminal of battery 6 through the ignition distributor breaker contacts 7 and point of reference or ground potential 5. Capacitor 8 is the conventional ignition distributor capacitor connected in parallel with the ignition distributor breaker contacts. While the distributor breaker contacts 7 are in the closed position, as shown in the FIGURE, an energizing circuit is completed for the ignition coil primary winding 4 and junction 9 is at substantially ground and while in the open position, the energizing circuit for the ignition coil primary winding 4 is interrupted and junction 9 is of a positive potential. Upon the interruption of the ignition coil primary winding 4, the resulting collapsing magnetic field induces an ignition spark potential in secondary winding 2 in a manner well known in the automotive art. A filter circuit comprising series connected resistor 10 and inductor 11 and parallel connected Zener diode 12 and capacitor 13 may be connected across the negative terminal of ignition coil primary winding 4 and point of reference or ground potential 5. Zener diode 12 is selected to have an inverse breakdown potential which will limit the potential appearing across junction 9 and point of reference or ground potential 5 to a workable signal level, for example, 5 volts. With this arrangement, a positive polarity potential signal, hereinafter referred to as the primary signal, appears upon circuit point 14(10) each time an ignition spark is generated for the engine by the operation of the ignition distributor breaker contacts 7 to the open position, as shown by the curve adjacent circuit point 14(10). Consequently, a series of positive polarity primary signals appears upon circuit point 14(10) of a frequency proportional to engine speed.

Figure 1:
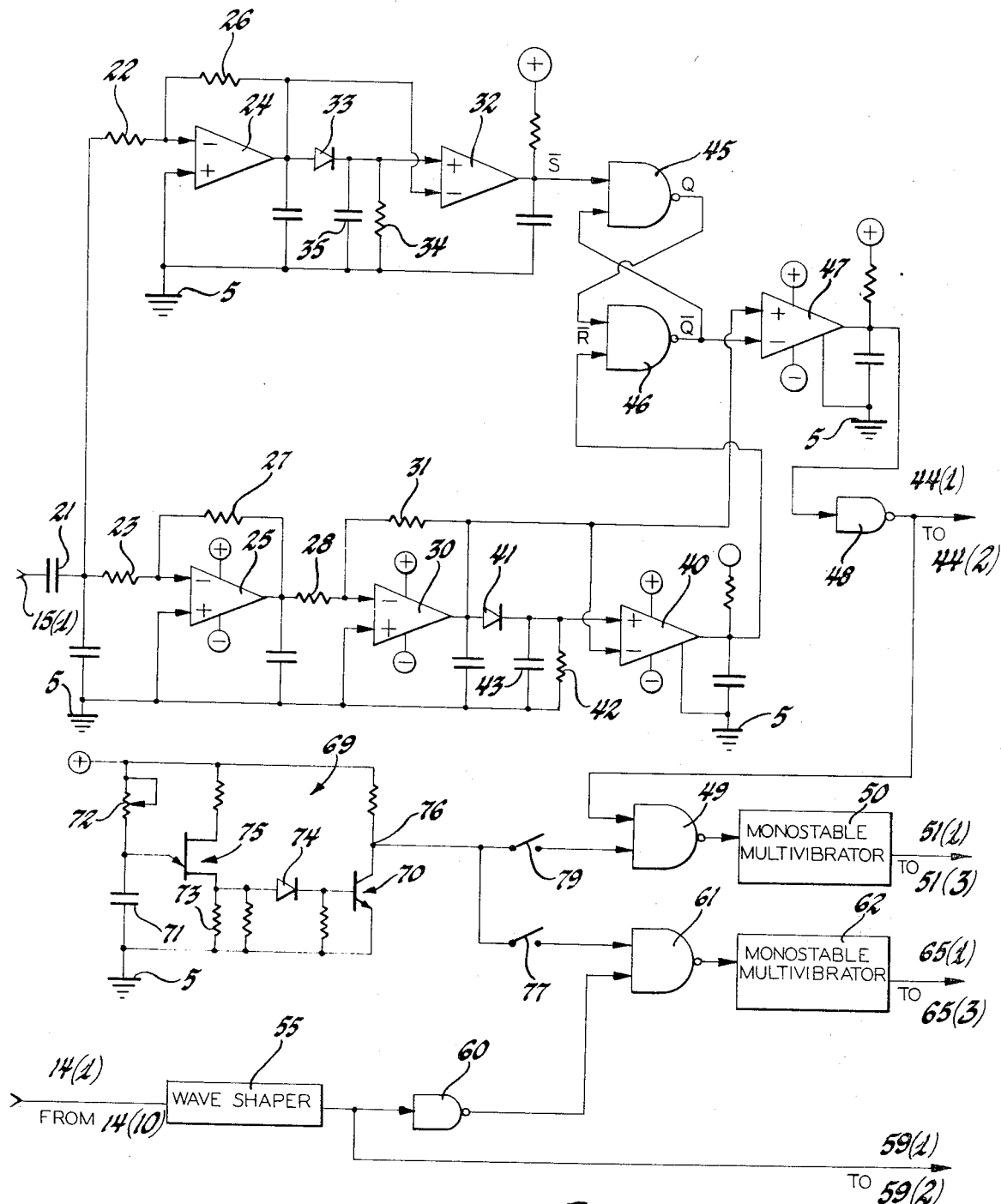
Figure 6:
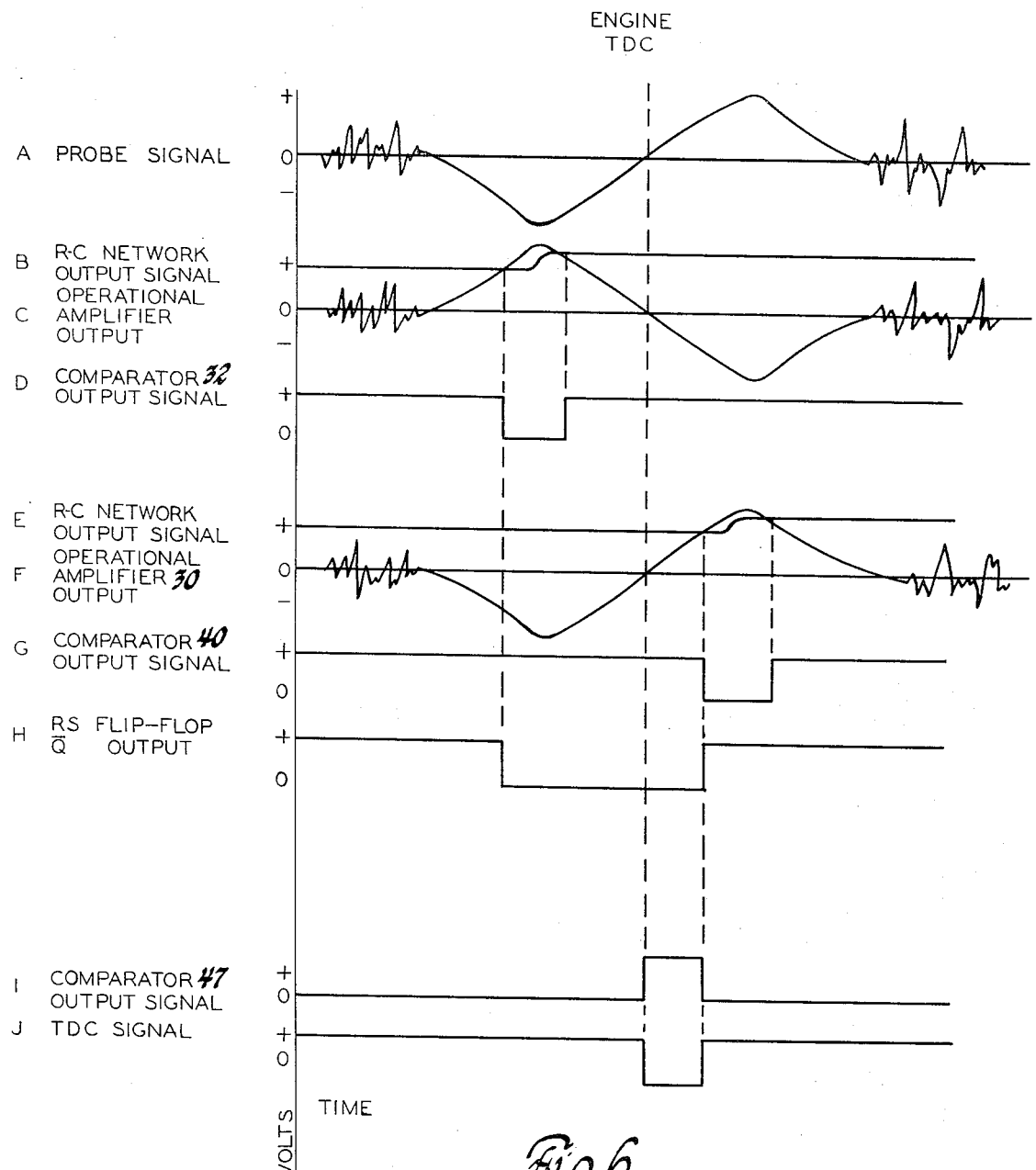
FIG. 6 is a set of curves useful in understanding the circuitry of FIG. 1.

As has previously been pointed out, the magnetic probe produces an alternating current output signal. The zero corss-over point of this signal occurs at the center of the axial timing mark on the harmonic balancer which indicates the reference cylinder top dead center position. Consequently, this signal must be conditioned by circuitry which generates a TDC signal pulse having a negative going leading edge occurring at the zero cross-over point of the alternating current probe signal. Referring to FIGS. 1 and 6, one side of the pick-up coil of the magnetic probe is connected to circuit point 15(1) OF FIG. 1, consequently, the probe signals, curve A of FIG. 6, are applied through coupling capacitor 21 and respective input resistors 22 and 23 to the inverting input terminal of each of conventional operational amplifiers 24 and 25 which function as direct current signal amplifiers. Feedback resistor 26, connected between the output and inverting input terminals of operational amplifier 24, and feedback resistor 27, connected between the output and inverting input terminals of operational amplifier 25, are proportioned relative to respective input resistors 22 and 23 to produce a predetermined gain through these devices. As the probe signals are applied to the inverting input terminal of both, operational amplifiers 24 and 25 amplify and invert the probe signals, curve C of FIG. 6. The amplified and inverted probe signals appearing upon the output terminal of operational amplifier 25 are applied through input resistor 28 to the inverting input terminal of operational amplifier 30 having a feedback resistor 31 connected between the output and inverting input terminals thereof of a value equal to input resistor 28. Consequently, operational amplifier 30 has a gain of 1 and functions only as an inverter which re-inverts the amplified and inverted probe signals appearing upon the output terminal of operational amplifier 25, curve F. The signals upon the output terminal of operational amplifier 24 are applied to the negative input terminal of comparator 32 and are rectified by diode 33 and applied across the resistor 34-capacitor 35 RC network. This RC network produces a signal which "rides the peaks" of the rectified output signal of operational amplifier 24, curve B, which is applied to the positive input terminal of comparator 32. The output signals appearing upon the output terminal of operational amplifier 30 are applied to the negative input terminal of comparator 40 and are rectified by diode 41 and applied to the resistor 42-capacitor 43 RC network. This RC network produces a signal which "rides the peaks" of the rectified output signal of operational amplifier 30, curve E, which is applied to the positive input terminal of comparator 40. Consequently, the probe signal, which is amplified and inverted by operational amplifier 24, is compared with the signal produced by the resistor 34-capacitor 35 RC network and the probe signal which is amplified and inverted by operational amplifier 25 and re-inverted by operational amplifier 30 is compared with the signal produced by the resistor 42-capacitor 43 RC NETWORK. Comparators 32 and 40 are commercially available items which produce a logic 1 output signal when the signal applied to the positive input terminal is more positive than the signal applied to the negative input terminal and a logic 0 output signal when the signal applied to the positive input terminal is less positive than the signal applied to the negative input terminal. The output signal of comparator 32 is applied to the $\bar{S}$ input terminal and the output signal of operational amplifier 40 is applied to the $\bar{R}$ input terminal of a conventionally constructed RS flip-flop comprising respective NAND gates 45 and 46. The RS flip-flop is a logic element well known in the art which produces a logic 1 signal upon the Q output terminal upon the application of a logic 0 signal to the $\bar{S}$ input terminal and a logic 1 signal upon the $\bar{Q}$ output terminal upon the application of a logic 0 signal to the $\bar{R}$ input terminal. It is the function of the RS flip-flop to produce a logic 0 signal upon the $\bar{Q}$ output terminal during the period that the probe signals cross zero from a selected one polarity to the other. Referring to curves B and C of FIG. 6, the signal produced by the resistor 34-capacitor 35 RC network, curve B, is more positive than the amplified and inverted probe signal, curve C, appearing upon the output terminal of operational amplifier 24 at the beginning of each negative half-cycle of the probe signal, consequently, a logic 1 signal appears upon the output terminal of comparator 32, curve D. The amplified and inverted probe signal increases in a positive direction until it reaches a magnitude substantially equal to the magnitude of the signal appearing across the RC network. At this time, comparator 32 changes state and a logic 0 signal appears upon the output terminal thereof, curve D, which is applied to the $\bar{S}$ input terminal of NAND gate 45 of the RS flip-flop. Upon the application of the logic 0 signal to the $\bar{S}$ input terminal of NAND gate 45, a logic 1 signal appears upon the Q output terminal thereof and a logic 0 signal, curve H, appears upon the $\bar{Q}$ output terminal thereof. This logic 0 signal is applied to the negative input terminal of comparator 47, consequently, a logic 0 signal, curve I, appears upon the output terminal thereof. The probe signal continues through its cycle until the re-inverted signal, curve F, appearing upon the output terminal of operational amplifier 30 crosses zero and begins to go positive. This positive polarity signal, applied to the positive input terminal of comparator 47, switches this device to the opposite state and a logic 1 output signal, curve I, appears upon the output terminal thereof. When the re-inverted probe signal, curve F, appearing upon the output terminal of operational amplifier 30 becomes more positive than the signal produced by the resistor 42-capacitor 43 RC network, curve E, comparator 40 switches state and a logic 0 signal appears upon the output terminal thereof, curve G. This logic 0 signal is applied to the $\bar{R}$ input terminal of NAND gate 46 of the RS flip-flop, consequently, a logic 1 signal, curve H, appears on the $\bar{Q}$ output terminal thereof. This logic 1 signal, applied to the negative input terminal of comparator 47 produces a logic 0 signal upon the output terminal thereof, curve I. As the logic of the circuit of this invention operates on negative going signals, the signal appearing upon the output terminal of comparator 47 is inverted by a conventional one-input NAND gate 48 to produce a TDC output signal having a negative going leading edge, as illustrated by curve J of FIG. 6. As the magnetic probe is located precisely over the center of the axial timing slot of the harmonic balancer at the zero cross-over point of the probe signal, the negative going leading edge of the TDC signal appearing upon the output terminal of signal inverter 48 occurs precisely at the top dead center position of the reference cylinder of the engine.

From this description, it is apparent that the circuitry of the upper portion of FIG. 1 just described produces a TDC signal when the reference cylinder of the engine is at the top dead center position.

One example of a commercially available operational amplifier circuit suitable for use as operational amplifiers 24, 25 and 30 is a type MC 1741 P-1 marketed by Motorola Semiconductor Products, Inc. and one example of a commercially available comparator circuit suitable for use as comparators 32, 40 and 47 is a type LM 331D marketed by National Semiconductor Corporation.

The TDC signal appearing upon the output terminal of NAND gate 48 is applied to one of the input terminals of two input NAND gate 49. With the logic 0 TDC signal applied to one of the input terminals, NAND gate 49 produces a logic 1 signal upon the output terminal thereof. This logic 1 output signal triggers monostable multivibrator 50 from the stable to the alternate state. The monostable multivibrator circuit is a circuit element well known in the art which is triggered by a logic 1 signal from the stable state to the alternate state, remains in the alternate state for a predetermined period of time and spontaneously returns to the stable state at the conclusion of the delay period. In a practical application of the circuit of this invention, monostable multivibrator 50 is designed to remain in the alternate state for a period of 10 milliseconds, consequently, this device produces a logic 1 signal of a pulse width of 10 milliseconds in response to each logic 0 TDC signal. The 10 millisecond pulses produced by monostable multivibrator 50 are applied through circuit points 51(1) of FIG. 1 and 51(3) of FIG. 3 to the inverting input terminal of operational amplifier 52 of the TDC monitor circuit schematically set forth in FIG. 3. Operational amplifiers 52 and 53 of FIG. 3 and the interconnecting circuitry constitute a double integrator circuit 36 which changes the series of 10 millisecond logic 1 input signals appearing upon point 51(3) to a direct current potential level signal upon the output terminal of operational amplifier 53 of a magnitude proportional to engine speed, hereinafter referred to as the TDC potential signal. That is, double integrator circuit 36 is responsive to the TDC signals for producing a direct current TDC potential signal of a magnitude proportional to engine speed.

One example of a commercially available operational amplifier circuit suitable for use as operational amplifiers 52 and 53 is a type MC 174 P-1 marketed by Motorola Semiconductor Products, Inc.

The positive polarity primary signal appearing upon circuit point 14(10) of FIG. 10 each time the distributor breaker contacts 7 are operated to the open condition may be applied through circuit points 14(10) of FIG. 10 and 14(1) of FIG. 1 to the input circuit of a wave shaper circuit 55, which may be any conventional wave shaping circuit well known in the art, to shape the primary signals to substantially square wave signals. Consequently, the primary signals are shaped by wave shaper circuit 55 and appear as a series of logic 1 square wave form primary signals upon the output circuit of wave shaper circuit 55 of a frequency proportional to engine speed, as shown by curve A of FIG. 7. These primary signals are inverted by one-input NAND gate 60 to logic 0 signals on the output terminal thereof which are applied to one of the input terminals of two-input NAND gate 61. Two-input NAND gate 61 produces a corresponding series of logic 1 signals, each of which triggers monostable multivibrator circuit 62 to the alternate state. As with monostable multivibrator 50, in a practical application of the circuit of this invention, monostable multivibrator 62 is designed to remain in the alternate state for a period of 10 milliseconds. Consequently, this device produces a logic 1 signal of a pulse width of 10 milliseconds in response to each primary signal which appears upon the output terminal thereof as a series of logic 1 signals of a frequency proportional to engine speed, hereinafter, referred to as the RPM signals. These signals are applied through circuit points 65(1) of FIG. 1 and 65(3) of FIG. 3 to the inverting input terminal of operational amplifier 66 of the RPM signal monitor circuit. Operational amplifiers 66 and 67 of FIG. 3 and the interconnecting circuitry constitute a double integrator circuit 37 which changes the series of 10 millisecond logic 1 input RPM signals appearing upon circuit point 65(3) to a direct current potential signal upon the output terminal of operational amplifier 67 of a magnitude proportional to engine speed, hereinafter referred to as the engine RPM potential signal. That is, the double integrator circuit 37 is responsive to the primary signals for producing a direct current engine RPM potential signal of a magnitude proportional to engine speed.

One example of a commercially available operational amplifier circuit suitable for use as operational amplifiers 66 and 67 is a type MC 1741 P-1 marketed by Motorola Semiconductor Products, Inc.

For purposes of calibrating the circuit of this invention, an oscillator circuit 69, FIG. 1, is provided. An eight cylinder engine operating at 150 RPM produces 10 primary signals per second, consequently, oscillator 69 is designed to produce logic 0 output signals at a frequency of 10 per second.

In FIG. 1, this oscillator is indicated as a conventional unijunction transistor type relaxation oscillator circuit and an inverting transistor. As is well known in the art, when capacitor 71 has become charged through variable resistor 72 to the peak point potential of unijunction transistor 75, this device conducts through the base electrodes. Upon the conduction of unijunction transistor 75, a potential appears across resistor 73 which is of a positive polarity upon the end connected to the anode electrode of diode 74. This potential produces a flow of current through diode 74 to supply base-emitter drive current to type NPN transistor 70 which triggers this device conductive through the collector-emitter electrodes. While transistor 70 is conducting through the collector-emitter electrodes, junction 76 is at substantially ground potential, a logic 0 signal. Consequently, oscillator circuit 69 produces a series of logic 0 signals upon junction 76 of a frequency of 10 per second.

Figure 3:
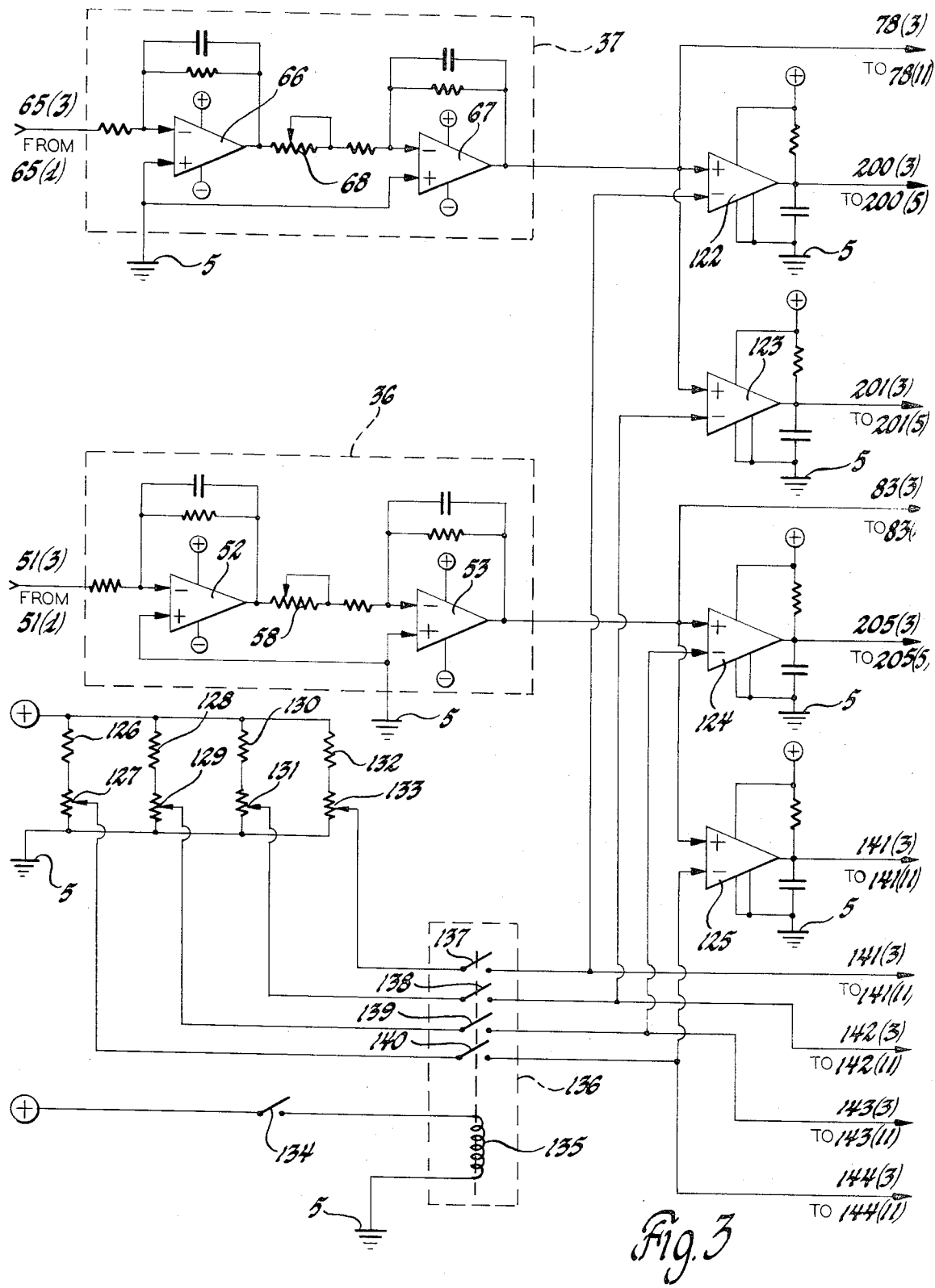

To calibrate the RPM signal monitor circuit of FIG. 3, electrical switch 77 of FIG. 1 is closed and maintained to apply the series of logic 0 signals upon junction 76 to one of the input terminals of NAND gate 61. these logic 0 signals are inverted to logic 1 signals by NAND gate 61 which trigger monostable multivibrator 62 to the alternate state ten times per second. Consequently, a series of 10 logic 1 signals of 10 milliseconds duration per second appears upon the output terminal of monostable multivibrator 62 and are applied through circuit points 65(1) of FIG. 1 and 65(3) of FIG. 3 to the inverting input terminal of operational amplifier 66 of the RPM signal monitor circuit. This series of signals is integrated by the double integrator circuit 37 and appear as a direct current potential level signal upon the output terminal of operational amplifier 67. This potential level signal is applied to digital voltmeter 82 of FIG. 11 through circuit points 78(3) of FIG. 3 and 78(11) of FIG. 11 and stationary terminal 80a and movable contact 81 of a selector switch 80. Potentiometer 68 of FIG. 3 is adjusted until digital voltmeter 82 reads 1.50 volts which is equal to 1.00 volt per hundred RPM. Consequently, with this calibration, the digital voltmeter reading indicates the engine speed in revolutions per minute.

To calibrate the TDC signal monitor circuit of FIG. 3, electrical switch 79 of FIG. 1 is closed and maintained to apply the series of logic 0 signals upon junction 76 to one of the input terminals of NAND gate 49. These logic 0 signals are inverted to logic 1 signals by NAND gate 49 which triggers monostable multivibrator 50 to the alternate state 10 times per second. Consequently, a series of ten logic 1 signals of 10 milliseconds duration per second appears upon the output terminal of monostable multivibrator 50 and are applied through circuit points 51(1) of FIG. 1 and 51(3) of FIG. 3 to the inverting input terminal of operational amplifier 52 of the TDC signal monitor circuit. This series of signals is integrated by the double integrator circuit 36 and appear as a direct current TDC potential signal upon the output terminal of operational amplifier 53. This TDC potential signal is applied to digital voltmeter 82 of FIG. 11 through circuit points 83(3) of FIG. 3 and 83(11) of FIG. 11 and stationary terminal 80b and movable contact 81 of a selector switch 80. As the TDC potential signal is proportional to engine speed and since there are four times as many primary signals as TDC signals per engine revolution, the frequency of 10 signals per second of oscillator circuit 69 is comparable to an engine speed of 600 RPM in regard to the TDC signals. Assuming 0.3 volts per 100 RPM of engine speed for the TDC potential signal, potentiometer 58 is adjusted until digital voltmeter 82 reads 1.80 volts.

In the internal combustion engine art, the number 1 engine cylinder is the reference cylinder, consequently, when the magnetic probe is in precise alignment with the center of the axial timing mark on the harmonic balancer, the number 1 engine cylinder is at the top dead center position. Therefore, a logic 0 ignition signal is produced having a negative going leading edge corresponding to the positive going leading edge of each primary signal appearing upon the output terminal of wave shaper circuit 55 of FIG. 1 when the engine ignition system produces an ignition spark potential for the number 1 cylinder.

In eight cylinder engines, the number 6 engine cylinder is at the top dead center position simultaneously with the number 1 engine cylinder. Therefore, a logic 0 ignition signal is produced having a negative going leading edge corresponding to the positive going leading edge of each primary signal appearing upon the output terminal of wave shaper circuit 55 of FIG. 1 when the engine ignition system produces an ignition spark potential for the number 1 and number 6 engine cylinders. As the firing order of an eight cylinder engine is cylinders 1-8-4-3-6-5-7-2, the primary signals corresponding to the number 1 and number 6 engine cylinders are separated by three other primary signals, as is best illustrated by curve A of FIG. 7. That is, beginning with the primary signal corresponding to the number 1 engine cylinder, every fifth primary signal, curve A of FIG. 7, corresponds to either the number 1 or number 6 engine cylinder.

Figure 2:
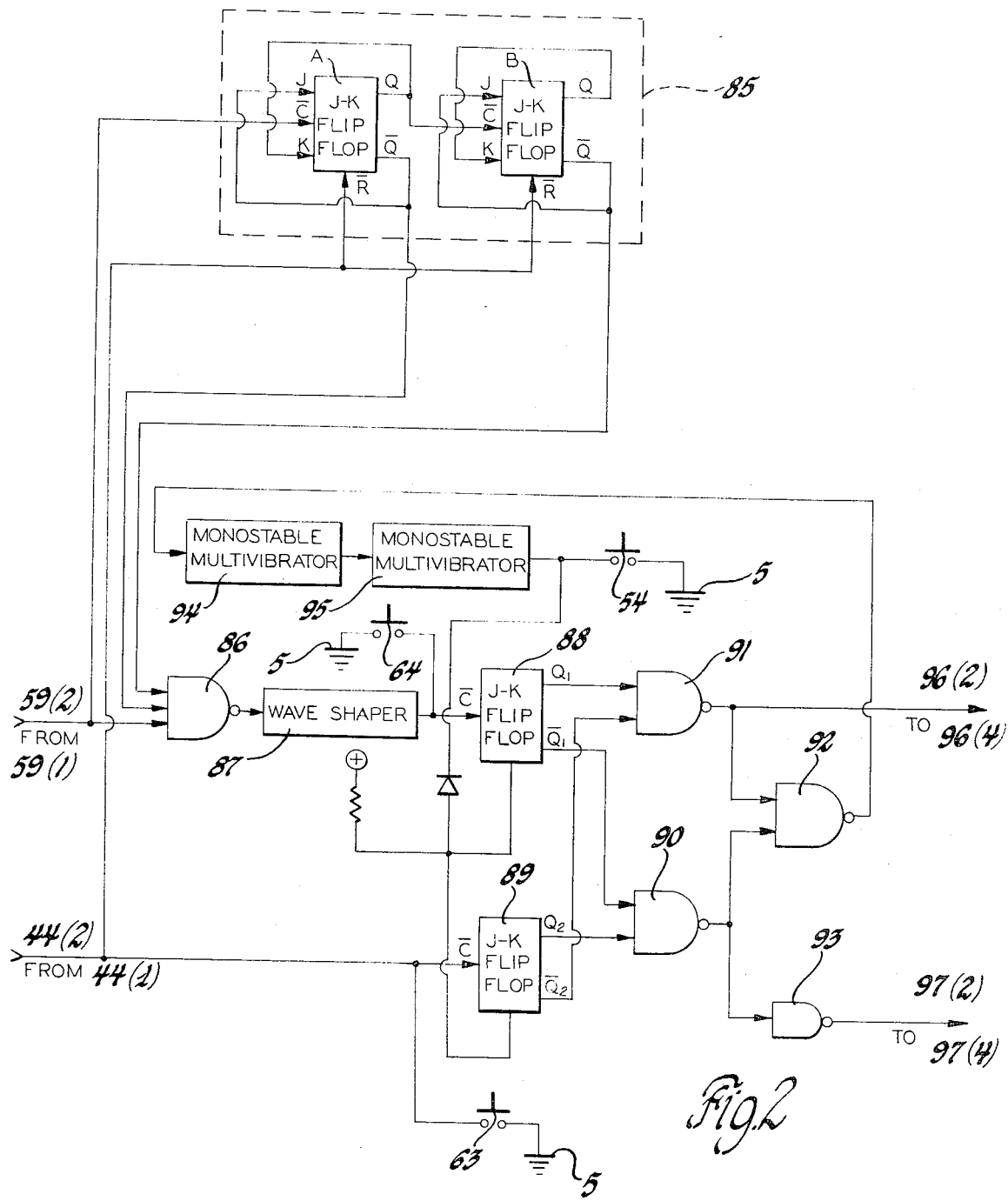
Figure 7:
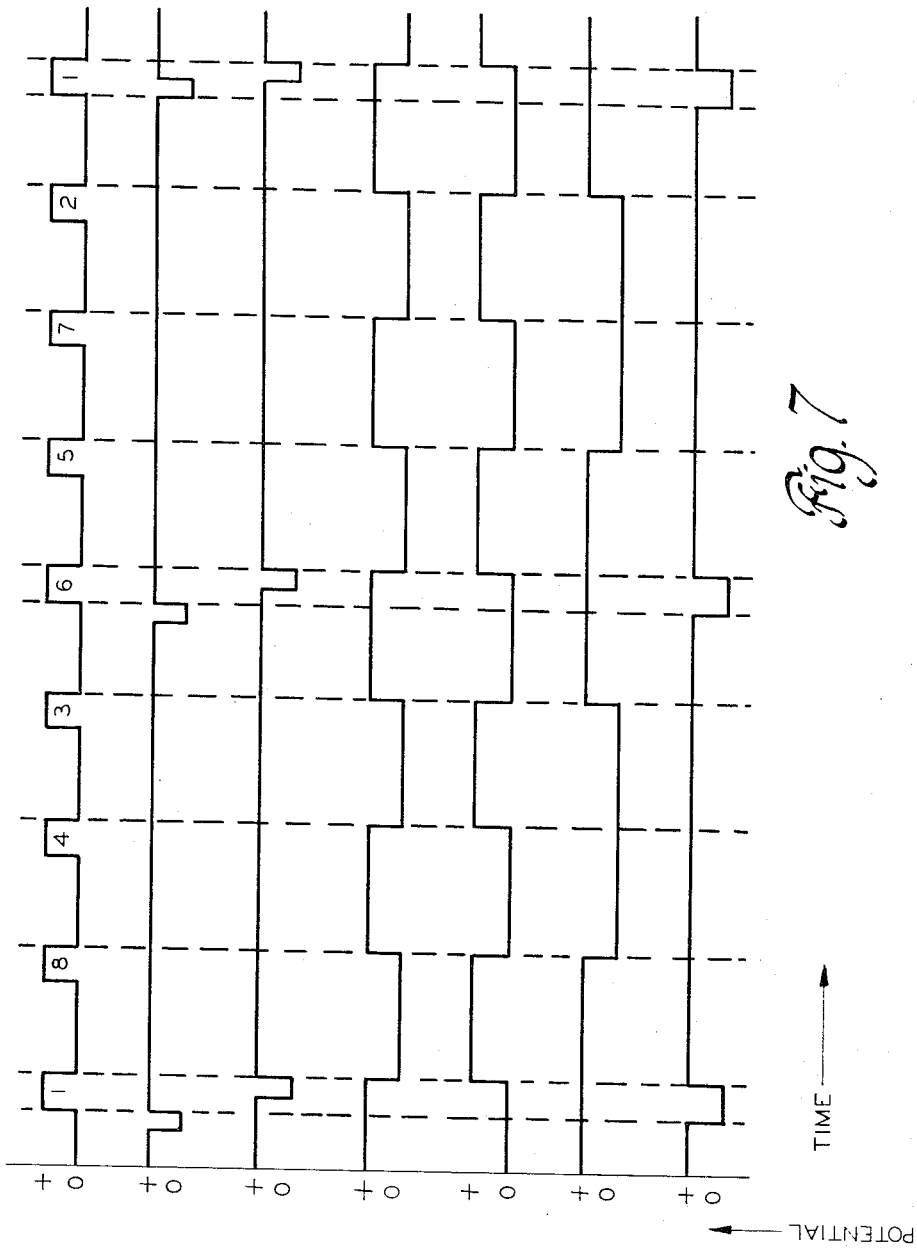
FIGS. 7, 8 and 9 are curves useful in understanding the circuitry of FIG. 2.

Circuitry responsive to the primary signals is provided for producing a logic 0 ignition signal when an ignition spark potential is generated for the reference cylinder of the engine. In a practical application of the circuit of this invention, a logic 0 ignition signal was produced for each primary signal corresponding to the number 1 and number 6 engine cylinders. One example, and without intention or inference of a limitation thereto, of this circuitry is a two-stage divide-by-four counter circuit 85 of FIG. 2, comprising two J-K flip-flop circuits A and B, each having a J, a K, a $\bar{C}$, or clock, and a $\bar{R}$ or reset, input terminals and Q and $\bar{Q}$ output terminals interconnected as shown in FIG. 2, and NAND gate 86. As J-K flip-flop circuits are commercially available logic elements and well known in the art, each has been illustrated in block form in FIG. 2. One example of a J-K flip-flop circuit suitable for use in the divide-by-four counter circuit of this invention is a type MC-663-P marketed by Motorola Semiconductor Products, Incorporated. Interconnected as shown in FIG. 2, J-K flip-flops A and B comprise a conventional divide-by-four counter circuit. For proper operation of J-K flip-flop circuits of this type, it is necessary that a logic 1 signal be maintained upon the $\bar{R}$ input terminal and the circuit may be reset to produce a logic 0 signal upon the Q output terminal and a logic 1 signal upon the $\bar{Q}$ output terminal by applying a logic 0 signal to the $\bar{R}$ input terminal. The series of primary signals appearing upon the output terminal of wave shaper circuit 55 of FIG. 1 are applied, through circuit points 59(1) of FIG. 1 and 59(2) of FIG. 2, to the $\bar{C}$ input terminal of J-K flip-flop A and to one input terminal of NAND gate 86. Consequently, J-K flip-flop A is triggered upon the negative transition of each primary signal, curves D and E OF FIG. 7, and J-K flip-flop B is triggered upon each negative transition of the Q output signal of J-K flip-flop A, curves E and F of FIG. 7. To synchronize counter 85 with the primary signals corresponding to the number 1 and number 6 engine cylinders, the TDC signals are applied, through circuit points 44(1) of FIG. 1 and 44(2) of FIG. 2, to the $\bar{R}$ input terminal of both J-K flip-flops A and B to reset counter circuit 85. Referring to FIG. 7, whether the engine ignition spark is retarded, as shown by curves A and B, or advanced, as shown by curves A and C, the TDC signal will reset counter 85 to produce a logic 1 signal upon the $\bar{Q}$ output terminal of both, as illustrated by curves D and F. Consequently, counter circuit 85 will always begin the count of one with the primary signal corresponding to the number 1 and number 6 engine cylinders. The negative going trailing edge of each of the primary signals triggers counter circuit 85 by one count, the fourth signal producing a logic 1 signal upon the $\bar{Q}$ output terminal of both J-K flip-flops A and B, curves D and F of FIG. 5, to enable NAND gate 86 of FIG. 2. Upon the occurrence of the next primary signal, corresponding to the number 1 or number 6 engine cylinders, a logic 1 signal is applied to all of the input terminals of NAND gate 86, consequently, a logic 0 ignition signal appears upon the output terminal thereof, curve G of FIG. 5.

That is, the circuitry just described is responsive to the primary signals for producing an ignition signal when an ignition spark is generated for the reference cylinder of the engine. It may be noted that a logic 0 signal is present upon at least one of the input terminals of NAND gate 86 upon the occurrence of each of the primary signals corresponding to the number 8, 4, 3, 5, 7 and 2 engine cylinders. With engines of more or less cylinders, the counter circuit 85 would be designed to be compatible with the number of engine cylinders of the engine being timed. The logic 0 ignition signals appearing upon the output terminal of NAND gate 86, which may be shaped by a conventional wave shaper circuit 87, are applied to the $\bar{C}$ clock terminal of J-K flip-flop 88 and the logic 0 TDC signals appearing upon the output terminal of one-input NAND gate 48 of FIG. 1 are applied to the $\bar{C}$ clock terminal of J-K flip-flop 89. The Q1 and $\overline{Q1}$ output terminals of J-K flip-flop 88 are connected to respective input terminals of NAND gates 91 and 90, the Q2 and $\overline{Q2}$ output terminals of J-K flip-flop 89 are connected to respective input terminals of NAND gates 90 and 91, the output terminals of NAND gates 90 and 91 are applied to respective input terminals of NAND gate 92, the output terminal of NAND gate 92 is applied to the input terminal of monostable multivibrator 94 and the complementary output terminal of monostable multivibrator 94 is applied to the input terminal of monostable multivibrator 95. The output signals of NAND gate 90 are inverted by one-input NAND gate 93. Monostable multivibrator circuits 94 and 95 are conventional logic elements well known in the art having a stable condition of operation and which may be triggered to an alternate state by a logic 1 signal applied to the input terminal. While in the alternate state, these circuits supply complementary output pulses for a period of time as determined by an RC delay network and return spontaneously to the stable state upon the conclusion of the time delay period. One example of a monostable multivibrator circuit suitable for use with this invention is a type MC-667P marketed by Motorola Semiconductor Products, Incorporated.

Figure 8:
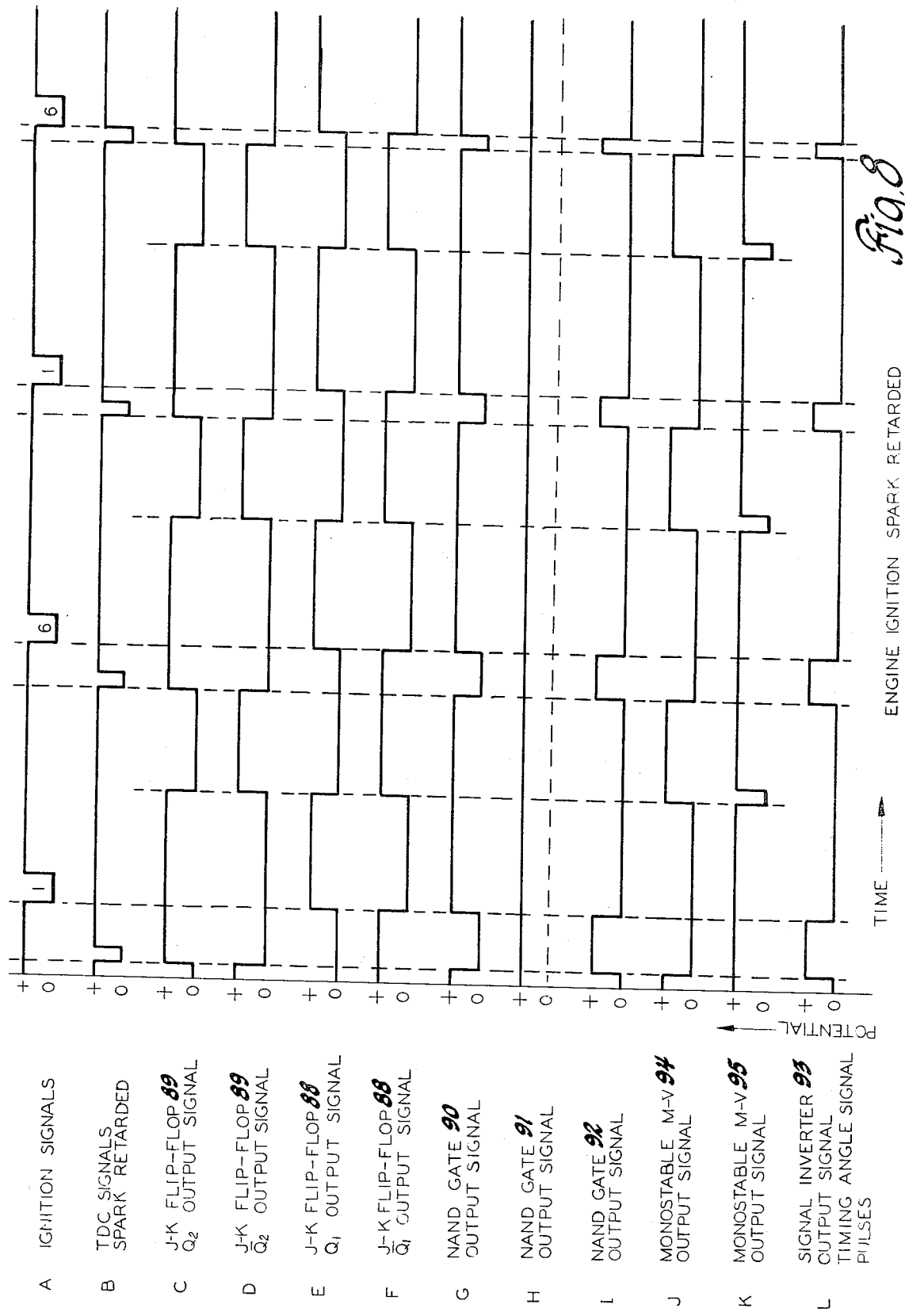

Assuming that the engine ignition spark is retarded and that J-K flip-flops 88 and 89 of FIG. 2 are in the reset condition, a logic 0 signal is present upon the Q1 output terminal of J-K flip-flop 88 and the Q2 output terminal of J-K flip-flop 89, curves E and C of FIG. 8, and a logic 1 signal is present upon the $\overline{Q1}$ output terminal of J-k flip-flop 88 and upon the $\overline{Q2}$ output terminal of J-K flip-flop 89, curves F and D. With flip-flops 88 and 89 in the reset condition, a logic 0 signal is applied to one of the input terminals of each of NAND gates 90 and 91 from the Q2 output terminal of J-K flip-flop 89 and the Q1 output terminal of J-K flip-flop 88, respectively. Therefore, NAND gates 90 and 91 both produce a logic 1 output signal, curves G and H. These logic 1 output signals are applied to respective input terminals of NAND gate 92 which, therefore, produces a logic 0 output signal, curve I. The next logic 0 TDC signal, curve B, triggers J-K flip-flop 89 to the other state in which a logic 1 signal appears upon the Q2 output terminal and a logic 0 signal appears upon the $\overline{Q2}$ output terminal thereof, curves C and D. The logic 1 signal upon the $\overline{Q1}$ output terminal of J-K flip-flop 88, curve F, and upon the Q2 output terminal of J-K flip-flop 89, curve C, are applied to respective input terminals of NAND gate 90 which, therefore, produces a logic 0 output signal, curve G, and the logic 0 signal upon output terminal Q1 of J-K flip-flop 88, curve E, and the logic 0 signal upon output terminal $\overline{Q2}$ of J-K flip-flop 89, curve D, are applied to respective input terminals of NAND gate 91 which, therefore, maintains the logic 1 output signal, curve H. The logic 0 output signal of NAND gate 90 and the logic 1 output signal of NAND gate 91 are applied to respective input terminals of NAND gate 92 which, therefore, produces a logic 1 output signal, curve I, which triggers monostable multivibrator 94 to the alternate state in which a logic 0 signal appears upon the output terminal thereof, curve J. The following logic 0 ignition signal, corresponding to the number 1 cylinder of the engine, curve A, triggers J-K flip-flop 88 to the other state in which a logic 1 signal is present upon the Q1 output terminal and a logic 0 signal is present upon the $\overline{Q1}$ output terminal thereof, curves E and F. The logic 0 signal upon the $\overline{Q1}$ output terminal of J-K flip-flop 88 and the logic 1 signal present upon the Q2 output terminal of J-K flip-flop 89 are applied to respective input terminals of NAND gate 90 which, therefore, produces a logic 1 output signal, curve G, and the logic 1 signal upon output terminal Q1 of J-K flip-flop 88 and the logic 0 signal upon output terminal $\overline{Q2}$ of J-K flip-flop 89 are applied to respective input terminals of NAND gate 91 which, therefore, maintains the logic 1 output signal, curve H, upon the output terminal thereof. The logic 1 output signal of NAND gate 90 and the logic 1 output signal of NAND gate 91 are applied to respective input terminals of NAND gate 92 which, therefore, produces a logic O output signal, curve I, which is applied to the input terminal of monostable multivibrator 94 but does not affect the condition thereof. Since the delay period designed into monostable multivibrator 94 has not elapsed, this device remains in the alternate state with a logic O signal present upon the output terminal thereof. At the conclusion of the delay period designed into monostable multivibrator 94, it spontaneously returns to the stable state in which a logic 1 signal, curve J, is present upon the output terminal thereof which, applied to the input terminal of monostable multivibrator 95, triggers this device to the alternate state in which a logic O rest signal is present upon the output terminal thereof, curve K. This logic 0 reset signal is applied to the $\overline{R}$ reset terminals of both J-K flip-flops 88 and 89 to reset these devices to the condition in which a logic 0 signal is present upon the Q1 output terminal of J-K flip-flop 88 and the Q2 output terminal of J-K flip-flop 89 and a logic 1 signal is present upon the $\overline{Q1}$ output terminal of J-K flip-flop 88 and the $\overline{Q2}$ output terminal of J-K flip-flop 89. From each reset condition, the TDC, ignition and reset signals operate the logic circuit of FIG. 2 in a manner just described to maintain a logic 1 signal upon the output terminal of NAND gate 91 curve H, and to produce a series of logic 0 output signals upon the output terminal of NAND gate 90 of a width equal to the period between each TDC signal and the next succeeding ignition signal, curve G. The series of logic 0 signals produced by NAND gate 90 are applied to a conventional one-input NAND gate 93 which produces a corresponding series of logic 1 timing angle output signals, curve L.

Figure 9:
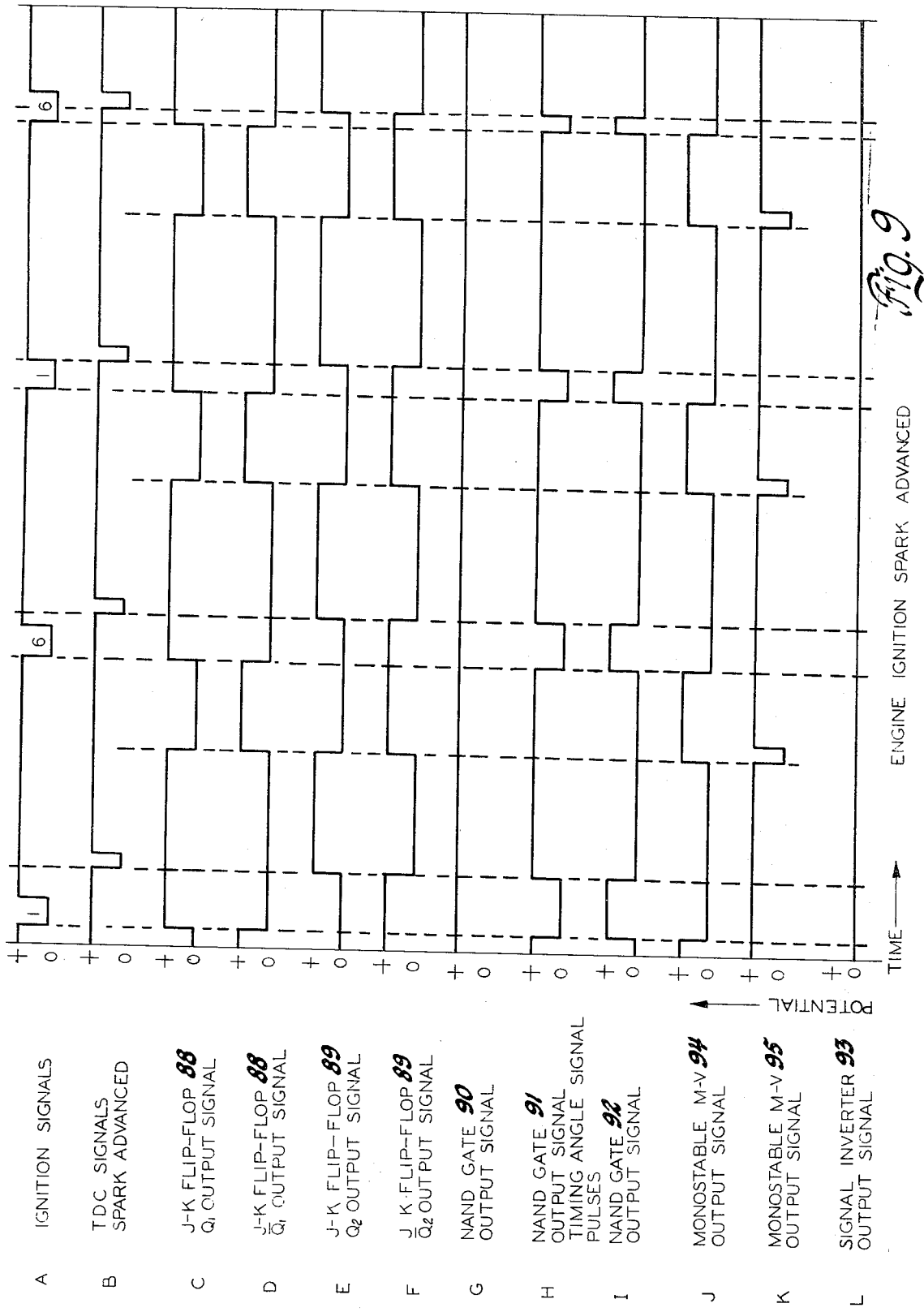

Assuming that the engine ignition spark is advanced and that J-K flip-flops 88 and 89 are in the reset condition, a logic 0 signal is present upon the Q1 output terminal of J-K flip-flop 88 and the Q2 output terminal of J-K flip-flop 89, curves C and E of FIG. 9, and a logic 1 signal is present upon the $\overline{Q1}$ output terminal of J-K flip-flop 88 and upon the $\overline{Q2}$ output terminal of J-K flip-flop 89, curves D and F. With flip-flops 88 and 89 in the reset condition, a logic 0 signal is applied to one of the input terminals of each of NAND gates 90 and 91 from the Q2 output terminal of J-K flip-flop 89 and the Q1 output terminal of J-K flip-flop 88, respectively. Therefore, NAND gates 90 and 91 both produce a logic 1 output signal, curves G and H. These logic 1 output signals are applied to respective input terminals of NAND gate 92 which, therefore, produces a logic 0 output signal, curve I. The next logic 0 ignition signal, curve A, triggers J-K flip-flop 88 to the other state in which a logic 1 signal appears upon the Q1 output terminal and a logic 0 signal appears upon the $\overline{Q1}$ output terminal thereof, curves C and D. The logic 1 signal upon the $\overline{Q2}$ output terminal of J-K flip-flop 89, curve F, and upon the Q1 output terminal of J-K flip-flop 88, curve C, are applied to respective input terminals of NAND gate 91 which, therefore, produces a logic 0 output signal, curve H, and the logic 0 signal upon output terminal Q2 of J-K flip-flop 89, curve E, and the logic 0 signal upon output terminal $\overline{Q1}$ of J-K flip-flop 88, curve D, are applied to respective input terminals of NAND gate 90 which, therefore, maintains the logic 1 output signal, curve G. The logic 0 output signal of NAND gate 91 and the logic 1 output signal of NAND gate 90 are applied to respective input terminals of NAND gate 92 which, therefore, produces a logic 1 output signal, curve I, which triggers monostable multivibrator 94 to the alternate state in which a logic signal appears upon the output terminal thereof, curve J. The following logic 0 TDC signal corresponding to the number 1 cylinder of the engine, curve B, triggers J-K flip-flop 89 to the other state in which a logic 1 signal is present upon the Q2 output terminal and a logic 0 signal is present upon the $\overline{Q2}$ output terminal thereof, curves E and F. The logic 1 signal upon the Q1 output terminal of J-K flip-flop 88 and the logic 0 signal present upon the $\overline{Q2}$ output terminal of J-K flip-flop 89 are applied to respective input terminals of NAND gate 91 which, therefore, produces a logic 1 output signal, curve H, and the logic 0 signal upon output terminal $\overline{Q1}$ of J-K flip-flop 88 and the logic 1 signal upon output terminal Q2 of J-K flip-flop 89 are applied to respective input terminals of NAND gate 90, which therefore, maintains the logic 1 output signal, curve G, upon the output terminal thereof. The logic 1 output signal of NAND GATE 90 and the logic 1 output signal of NAND gate 91 are applied to respective input terminals of NAND gate 92 which, therefore, produces a logic 0 output signal, curve I, which is applied to the input terminal of monostable multivibrator 94 but does not affect the condition thereof. Since the delay period designed into monostable multivibrator 94 has not elapsed, this device remains in the alternate state with a logic 0 signal present upon the output terminal thereof. At the conclusion of the delay period designed into monostable multivibrator 94, it spontaneously returns to the stable state in which a logic 1 signal, curve J, is present upon the output terminal thereof which, applied to the input terminal of monostable multivibrator 95, triggers this device to the alternate state in which a logic 0 reset signal is present upon the output terminal thereof, curve K. This logic 0 reset signal is applied to the $\overline{R}$ reset terminals of both J-K flip-flops 88 and 89 to reset these devices to the condition in which a logic 0 signal is present upon the Q1 output terminal of J-K flip-flop 88 and the Q2 output terminal of J-K flip-flop 89 and a logic 1 signal is present upon the $\overline{Q1}$ output terminal of J-K flip-flop 88 and the $\overline{Q2}$ output terminal of J-K flip-flop 89. From each reset condition, ignition, TCD and reset signals operate the logic circuit of FIG. 2 in a manner just described to maintain a logic 1 signal upon the output terminal of NAND gate 90, curve G, and to produce a series of logic 0 timing angle output signals upon the output terminal of NAND gate 91 of a width equal to the period between each logic 0 ignition signal and the next succeeding logic 0 TDC signal, curve H. The logic 1 signal maintained upon NAND gate 90 is applied to a conventional signal inverter circuit NAND gate 93 which maintains a corresponding logic 0 output signal, curve L.

From this description, it is apparent that the logic circuitry of FIG. 2 just described, comprising monostable multivibrator circuits 94 and 95, J-K flip-flops 88 and 89 and NAND gates 90, 91, 92 and 93, is responsive to the TDC and ignition signals for producing a series of timing angle signal pulses each of a width equal to the period between the TDC and ignition signals when the ignition spark is retarded and to the period between the ignition and TDC signals when the ignition spark is advanced.

From the foregoing description, it is apparent that, while the engine ignition spark is retarded, a logic 1 signal is maintained upon the output terminal of NAND gate 91 and circuit point 96(2) and a series of logic 1 timing angle signals of a width equal to the period between each TDC signal and the next succeeding ignition signal appears upon the output terminal of NAND gate 93 and circuit point 97(2) and while the engine ignition spark is advanced, a logic 0 signal is maintained upon the output terminal of NAND gate 93 and circuit point 97(2) and a series of logic 0 timing angle signals of a width equal to the period between each ignition signal and the next succeeding TDC signal appears upon the output terminal of NAND gate 91 and circuit point 96(2). These signals are applied to a timing averager circuit, schematically set forth in FIG. 4, through respective circuit points 96(2) of FIG. 2 and 96(4) of FIG. 4 and 97(2) of FIG. 2 and 97(4) of FIG. 4. The timing averager circuit of FIG. 4 averages the logic 1 timing angle signals appearing upon the output terminal of NAND gate 93 and circuit points 97(2) of FIG. 2 and 97(4) of FIG. 4 while the engine ignition spark is retarded to produce a negative polarity timing angle potential signal of a magnitude proportional to the number of degrees of ignition spark retard and averages the logic 0 timing angle signals appearing upon the output terminal of NAND gate 91 and circuit point 96(2) of FIG. 2 and circuit point 96(4) of FIG. 4 while the engine ignition spark is advanced to produce a positive polarity timing angle potential signal of a magnitude proportional to the number of degrees of ignition spark advance, in a manner now to be explained.

Figure 4:
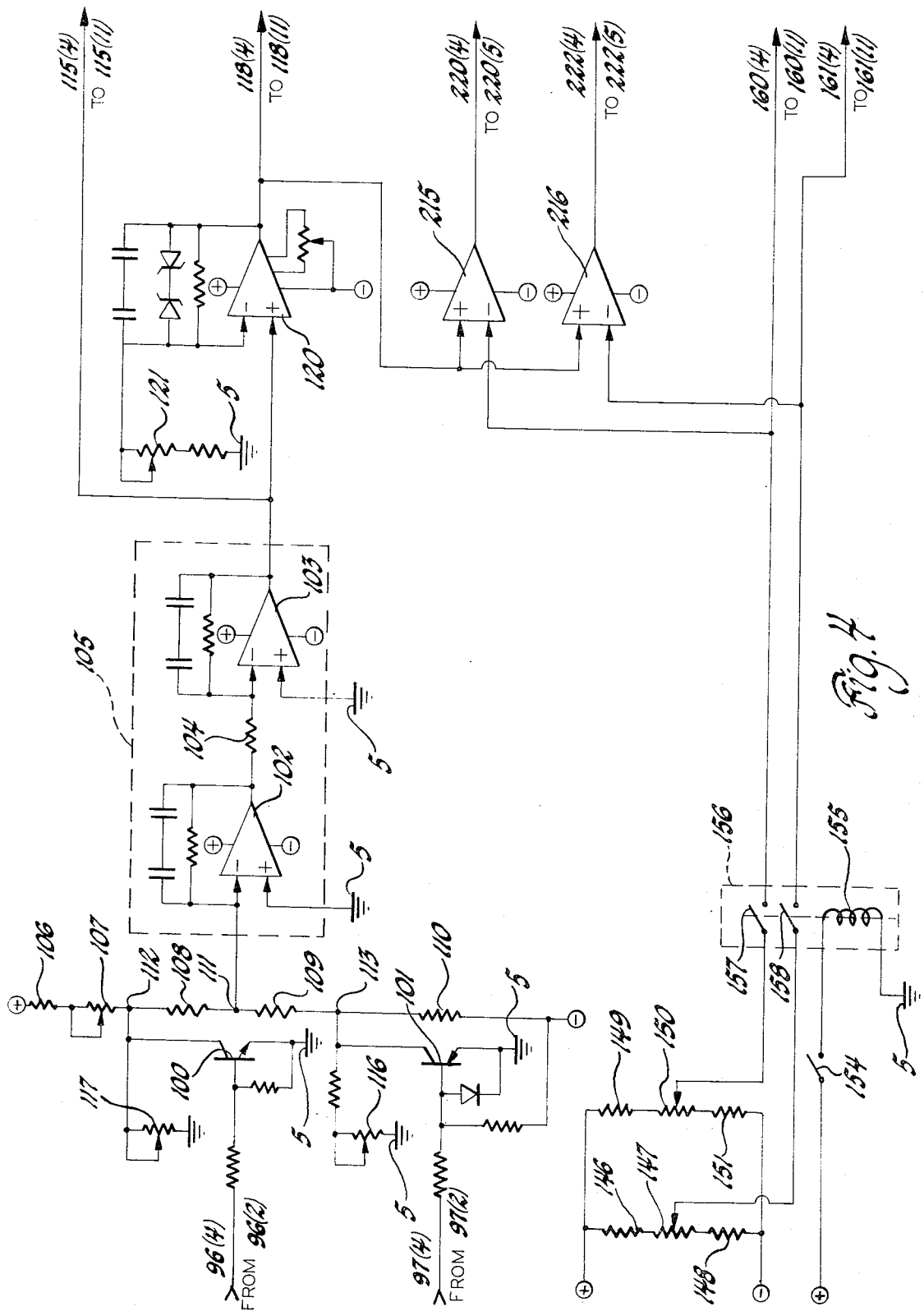

The two transistors 100 and 101 of FIG. 4 function as inverter translators and conventional operational amplifiers 102 and 103 and coupling resistor 104 function as a double integrator circuit 105 which converts input signal pulses into a direct current potential level of a magnitude proportional to the average value of the input pulses. The series combination of resistor 106, potentiometer 107, resistor 108, resistor 109 and resistor 110 are connected across the positive and negative polarity terminals of a conventional direct current power supply, not shown. As the power supply may be any one of the conventional direct current power supplies having a positive and a negative polarity output terminal well known in the art, in the interest of reducing drawing complexity, the power supply has not been illustrated in FIG. 4, the polarity only being indicated. In a practical application of the circuit of this invention, and without intention or inference of a limitation thereto, a conventional direct current power supply which provided output direct current potentials of +18 volts and −18 volts was employed. The inverting input terminal of operational amplifier 102 is connected to junction 111, between series resistors 108 and 109, the collector-emitter electrodes of type NPN transistor 100 are connected between junction 112, between potentiometer 107 and resistor 108, and point of reference or ground potential 5 and the collector-emitter electrodes of type PNP transistor 101 are connected between junction 113, between series resistors 109 and 110, and point of reference or ground potential 5. To calibrate the timing averager circuit of FIG. 4 for direct readout on the digital voltmeter 82 of FIG 11 in number of degrees of ignition spark retard or advance, momentary contact reset push button switch 54 of FIG. 2 is momentarily depressed to place J-K flip-flops 88 and 89 in the reset condition which results in a logic 1 signal upon the output terminal of NAND gate 91 and a logic 0 signal upon the output terminal of NAND gate 93, as previously described. The logic 1 signal appearing upon the output terminal of NAND gate 91 is applied to the base electrode of type NPN transistor 100 of FIG. 4 through circuit points 96(2) and 96(4) and the logic 0 signal appearing upon the output terminal of NAND gate 93 is applied to the base electrode of type PNP transistor 101 of FIG. 4 through circuit points 97(2) and 97(4). The logic 1 signal present upon the base electrode of type NPN transistor 100 produces conduction through the collector-emitter electrodes thereof to place junction 112 at substantially ground potential and the logic 0 signal present upon the base electrode of type PNP transistor 101 produces emitter-collector conduction therethrough to place junction 113 at substantially ground potential. The output terminal of operational amplifier 103 is connected to the digital voltmeter of FIG. 11 through circuit points 115(4) of FIG. 4 and 115(11) of FIG. 11, and stationary contact 80C and movable contact 81 of switch 80. Potentiometer 107, which adjusts the degree of conduction through transistor 100, is adjusted until the digital voltmeter reads zero volts. The momentary contact retard calibration push button switch 63 of FIG. 2 is then depressed to place J-K flip-flops 88 and 89 in the ignition spark retarded condition which results in a logic 1 signal upon the output terminal of both of NAND gate 91 and 93 which are applied to the base electrodes of respective transistors 100 and 101 of FIG. 4 through circuitry previously described. The logic 1 signal applied to the base electrode of type NPN transistor 100 produces collector-emitter conduction through this device to place junction 112 at substantially ground potential and the logic 1 signal applied to the base electrode of type PNP transistor 101 maintains this device not conductive, consequently, junction 111 is of a negative polarity with respect to junction 112. Assuming 0.04 volts per degree of ignition spark retard or advance and since there are 360 crankshaft degrees, potentiometer 116 is adjusted until the digital voltmeter 82 of FIG. 11 reads −14.40 volts. The momentary contact reset push button switch 54 of FIG. 2 is then momentarily depressed and the momentary contact advance calibration push button switch 64 is depressed to place J-K flip-flops 88 and 89 in the ignition spark advanced condition which results in a logic 0 signal upon the output terminal of both NAND gates 91 and 93 which are applied to the base electrodes of respective transistors 100 and 101 of FIG. 4 through circuitry previously described. The logic 0 signal applied to the base electrode of type NPN transistor 100 maintains this device not conductive and the logic 0 signal applied to the base electrode of type PNP transistor 101 produces emitter-collector conduction through this device to place junction 113 at substantially ground potential, consequently, junction 111 is of a positive polarity with respect to junction 113. Potentiometer 117 is then adjusted until the digital voltmeter 82 of FIG. 11 reads +14.40 volts. The output terminal of operational amplifier 103 is also connected to the non-inverting input terminal of operational amplifier 120. Potentiometer 121 is adjusted until operational amplifier 120 has a gain of 25. The output terminal of operational amplifier 120 is applied to the digital voltmeter 82 of FIG. 11 through circuit points 118(4) of FIG. 4 and 118(11) of FIG. 11 and stationary contact 80d and movable contact 81 of switch 80. With the assumed 0.4 volts per degree of advance or retard and with the gain of operational amplifier 120 adjusted to 25, digital voltmeter 82 will indicate directly in degrees the ignition spark advance or retard.

This averager circuit just described is responsive to the timing angle signal pulses for producing a direct current timing angle potential of a selected one polarity when the ignition spark is retarded and of the opposite polarity when the ignition spark is advanced and of a magnitude proportional to the number of degrees of ignition spark retard or advance upon the output terminal of operational amplifier 120 in a manner to be explained later in this specification.

One example of a commercially available operational amplifier circuit suitable for use as operational amplifiers 102 and 103 is a type 3293/14 marketed by Burr-Brown Research Corp., and for operational amplifier 120 is a type MC 1741P-1 marketed by Motorola Semiconductor Products, Inc.

Internal combustion engines are usually timed at a specific engine speed. For purposes of this specification, and without intention or inference of a limitation thereto, the internal combustion engine ignition timing instrument of this invention will be described on the basis of timing and internal combustion engine at a speed of 600 RPM. As has been previously brought out in this specification, a direct current engine RPM potential signal and a direct current TDC potential signal, each of a magnitude proportional to engine speed appears upon the output terminal of respective operational amplifiers 67 and 53 of FIG. 3. To provide an indication that the engine is running at the selected speed at which it is to be timed, the engine RPM potential signal appearing upon the output terminal of operational amplifier 67 is compared with a direct current engine RPM low reference potential signal and a direct current engine RPM high reference potential signal by respective comparator circuits 122 and 123 and to insure that the proper number of logic 0 TDC signals are being produced at the selected engine speed, the direct current TDC potential signal appearing upon the output terminal of operational amplifier 53 is compared with a direct current TDC high reference potential signal and a direct current TDC low reference potential signal by respective comparator circuits 124 and 125. Consequently, circuitry for providing the engine RPM low and high reference potential signals and the TDC high and low reference potential signals is provided and may be, FIG. 3, the series of combination of resistor 126 and potentiometer 127, the series combination of resistor 128 and potentiometer 129, the series combination of resistor 130 and potentiometer 131, and the series combination of resistor 132 and potentiometer 133 connected in parallel across the output terminals of a conventional source of direct current potential.

Comparator 123 is responsive to the engine RPM potential signal and the engine RPM high reference potential signal for producing a logic 1 output signal when the magnitude of the engine RPM potential signal is greater than and a logic 0 output signal when the magnitude of the engine RPM potential signal is less than the magnitude of the engine RPM high reference potential signal, and comparator 122 is responsive to the engine RPM potential signal and the engine RPM low reference potential signal for producing a logic 1 output signal when the magnitude of the engine RPM potential signal is greater than a logic 0 output signal when the magnitude of the engine RPM potential signal is less than the magnitude of the engine RPM low reference potential signal.

Comparator 124 is responsive to the TDC potential signal and the TDC high reference potential signal for producing a logic 1 output signal when the magnitude of the TDC potential signal is greater than and a logic 0 output signal when the magnitude of the TDC potential signal is less than the magnitude of the TDC high reference potential signal and comparator 125 is responsive to the TDC potential signal and the TDC low reference potential signal for producing a logic 1 output signal when the magnitude of the TDC potential signal is greater than and a logic 0 output signal when the magnitude of the TDC potential signal is less than the magnitude of the TDC low reference potential signal.

One example of a commercially available comparator circuit suitable for use as comparators 122, 123, 124 and 125 is a type LM311D marketed by National Semiconductor Corporation.

Switch 134 is operated to the electrical circuit closed condition to energize operating coil 135 of relay 136 which operates the associated normally open contacts 137, 138, 139 and 140 to the electric circuit closed condition. Assuming that the engine is to be timed at a speed of 600 RPM, the engine RPM and TDC reference potential signals are adjusted to provide a range extending above and below 600 RPM, for example, plus or minus 50 RPM. Movable contact 81 of switch 80 of FIG. 11 is operated into electrical contact with stationary contact 80e, connected to the movable contact of potentiometer 133 through circuit points 141(11) of FIG. 11 and 141(3) of FIG. 3 and closed relay contact 137, and the movable contact of potentiometer 133 is adjusted until the digital voltmeter 82 of FIG. 11 reads 5.50 volts or 550 RPM at 1 volt per 100 RPM. Movable contact 81 of switch 80 of FIG. 11 is next operated into electrical contact with stationary contact 80f, connected to the movable contact of potentiometer 131 through circuit points 142(11) of FIG. 11 and 142(3) of FIG. 3 and closed relay contact 138, and the movable contact of potentiometer 131 is adjusted until the digital voltmeter 82 reads 6.50 volts or 650 engine RPM at 1 volt per 100 RPM. Movable contact 81 of switch 80 is then operated into electrical contact with stationary contact 80g, connected to the movable contact of potentiometer 129 through circuit points 143(11) of FIG. 11 and 143(3) of FIG. 3 and closed relay contact 139, and the movable contact of potentiometer 139 is adjusted until the digital voltmeter 82 reads 3.15 volts, the magnitude of the TDC potential signal at 650 RPM at 0.3 volts per 100 RPM. Movable contact 81 of switch 80 is next operated into electrical contact with stationary contact 80h, connected to the movable contact of potentiometer 127 through circuit points 144(11) of FIG. 11 and 144(3) of FIG. 3 and closed relay contact 140 and the movable contact of potentiometer 127 is adjusted until the digital voltmeter 82 reads 1.65 volts, the magnitude of the TDC potential signal at 550 engine RPM at 0.3 volts per 100 RPM. Should it be desirable or required that the engine be timed at speeds different than 600 RPM, additional circuitry for producing the engine RPM low and high and the TDC high and low reference potential signals may be provided for each different desired engine speed.

Internal combustion engines are usually timed at a specific number of degrees of ignition spark advance or retard at a specific engine speed. For purposes of this specification, and without intention or inference of a limitation thereto, the internal combustion engine ignition timing instrument of this invention will be described on the basis of timing an internal combustion engine at 5° ignition spark advance at an engine speed of 600 RPM. As has been previously brought out in this specification, a direct current timing angle potential signal of a magnitude proportional to the number of degrees of ignition spark advance or retard appears upon the output terminal of operational amplifier 120 of FIG. 4. To provide an indication that the engine is properly timed at the selected speed of 600 RPM at which it is to be timed, the timing angle potential signal appearing upon the output terminal of operational amplifier 120 is compared with a direct current timing angle reference potential signal and a direct current timing angle high reference potential signal by respective comparator circuits 215 and 216. Consequently, circuitry for providing timing angle high and low reference potential signals is provided and may be, FIG. 4, the series combination of resistor 146, potentiometer 147 and resistor 148 and the series combination of resistor 149, potentiometer 150 and resistor 151 connected in parallel across the positive and negative polarity output terminals of a conventional source direct current potential providing positive and negative output potentials.

Comparator 216 is responsive to the timing angle potential signal and the timing angle high reference potential signal for producing a logic 1 output signal when the magnitude of the timing angle potential signal is greater than and a logic 0 output signal when the magnitude of the timing angle potential signal is less than the magnitude of the timing angle high reference potential signal and comparator 215 is responsive to the timing angle potential signal and the timing angle low reference potential signal for producing a logic 1 output signal when the magnitude of the timing angle potential signal is greater than and a logic 0 output signal when the magnitude of the timing angle potential signal is less than the magnitude of the timing angle low reference potential signal.

One example of a commercially available comparator circuit suitable for use as comparators 215 and 216 is a type LM311D marketed by National Semiconductor Corporation.

Switch 154 is operated to the electrical circuit closed condition to energize operating coil 155 of relay 156 which operates the associated normally open contacts 157 and 158 to the electric circuit closed condition. Assuming that the engine ignition spark is to be timed to occur at 5° before top dead center or 5° advance, the timing angle reference potential signals are adjusted to provide a range extending above and below the required number of degrees of ignition spark advance, for example, plus or minus 0.2°. Movable contact 81 of switch 80 of FIG. 11 is operated into electrical contact with stationary contact 80i, connected to the movable contact of potentiometer 150 through circuit points 160(11) of FIG. 11 and 160(4) of FIG. 4 and closed relay contact 157, and the movable contact of potentiometer 150 is adjusted until the digital voltmeter 82 reads +4.8 volts, the magnitude of the timing angle potential signal at 4.8° spark advance at 1 volt per degree. Movable contact 81 of switch 80 of FIG. 11 is next operated into electrical contact with movable contact 80j, connected to the movable contact of potentiometer 147 through circuit points 161(11) of FIG. 11 and 161(4) of FIG. 4 and closed relay contact 158, and the movable contact of potentiometer 147 is adjusted until the digital voltmeter 82 reads 5.2 volts, the magnitude of the timing angle potential signal at 5.2° spark advance. Should it be desirable or required that the engine ignition spark be timed for other degrees of advance or retard, additional circuitry for producing the timing angle low and high reference potential signals may be provided for each ignition spark advance or retard setting required.

Figure 5:
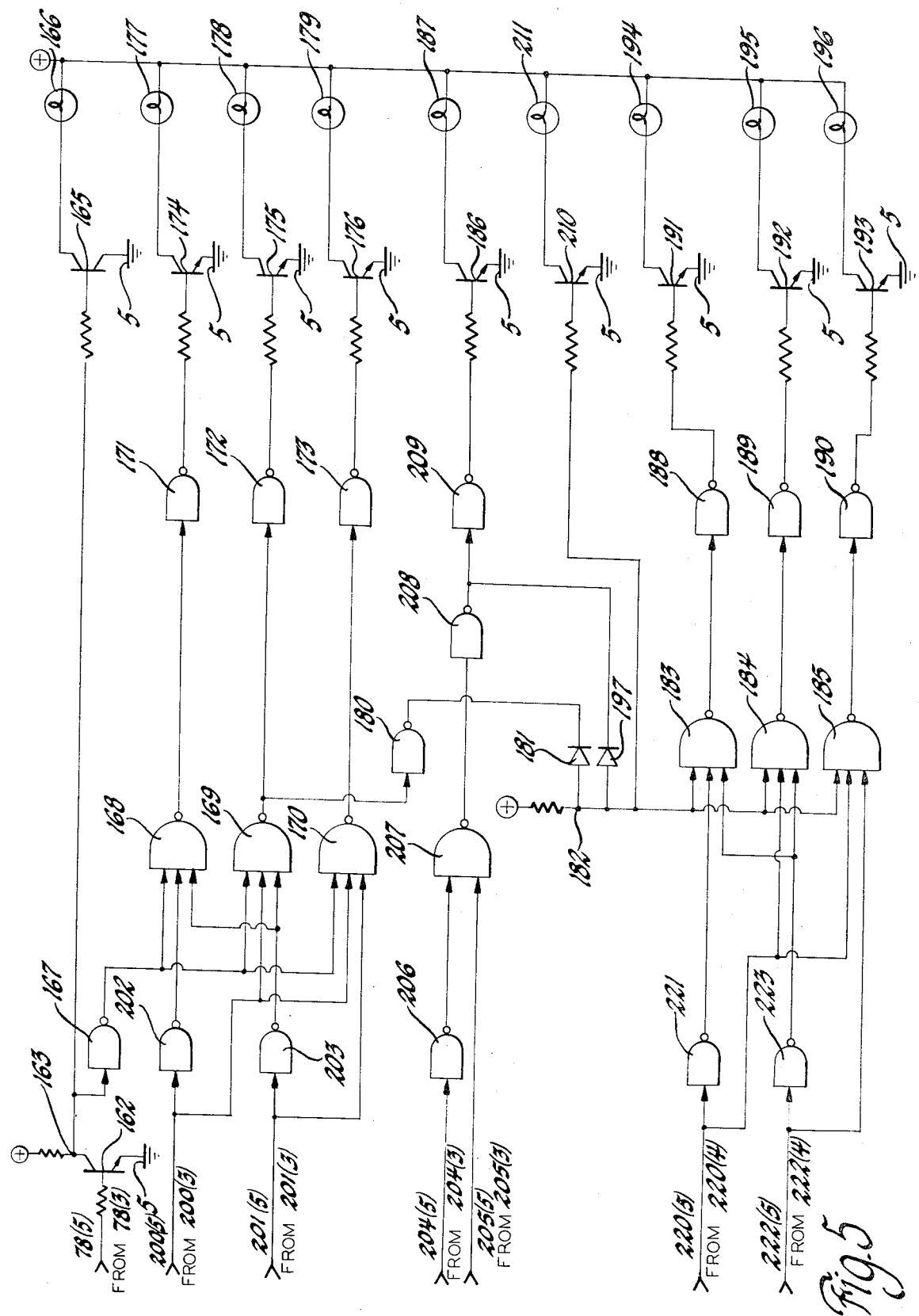

After the internal combustion engine ignition timing instrument of this invention has been calibrated as hereinabove described, the magnetic probe adjacent the engine harmonic balancer is connected to circuit point 15(1) of FIG. 1 and circuit point 14(10) of FIG. 10 is connected to circuit point 14(1) of FIG. 1 and the engine is operated in the running mode. Referring to FIG. 5, the collector-emitter electrodes of a type NPN transistor 162 are connected across the positive polarity terminal of a conventional direct current potential source, now shown, and point of reference or ground potential 5 and the base electrode is connected to the output terminal of operational amplifier 67 of the double integrator circuit 37 of FIG. 3 through circuit points 78(5) of FIG. 5 and 78(3) of FIG. 3. In the absence of an engine RPM potential signal upon the output terminal of operational amplifier 67, transistor 162 of FIG. 5 does not conduct, consequently, a positive polarity potential is present upon junction 163. This positive polarity potential is applied to the base electrode of a type NPN indicator lamp driver transistor 165 in the proper polarity relationship to produce base-emitter drive current therethrough to trigger this device conductive through the collector-emitter electrodes to establish an energizing circuit for "No Engine RPM Signal" indicator lamp 166 to illuminate this device which indicates there are no primary signals being generated across the ignition breaker contacts. This logic 1 signal is inverted to a logic 0 signal by NAND gate 167 and applied to one of the input terminals of each of the three input NAND gates 168, 169 and 170. The resulting logic 1 signal appearing upon the output terminal of each of these NAND gates is inverted by respective NAND gates 171, 172 and 173 to logic 0 signals which are applied to the base electrodes of each of respective indicator lamp driver transistors 174, 175 and 176. With a logic 0 upon the base electrode of each of transistors 174, 175 and 176, these devices do not conduct through the collector-emitter electrodes, consequently, the "Engine RPM Low" indicator lamp 177, the "Engine RPM In" indicator lamp 178 and the "Engine RPM High" indicator lamp 179 are extinguished. The logic 1 signal appearing upon the output terminal of NAND gate 169 is inverted to a logic 0 signal by NAND gate 180 which is applied to the cathode electrode of diode 181 to forward bias this device. Therefore, a logic 0 signal appears upon junction 182. This logic 0 signal is applied to one of the input terminals of each of three input NAND gates 183, 184 and 185. The resulting logic 1 signal appearing upon the output terminal of each of these NAND GATES is inverted to a logic 0 signal by respective NAND gates 188, 189 and 190 which is applied to the base electrode of respective type NPN indicator lamp driver transistors 191, 192 and 193. With a logic 0 signal present upon the base electrode of each of these transistors, these devices do not conduct through the collector-emitter electrodes, consequently, the "Time Retarded" indicator lamp 194, the "Time-In" indicator lamp 195 and the "Time Advanced" indicator lamp 196 are not illuminated. The logic 0 signals present upon one of the input terminals of each of three input NAND gates 168, 169, 170, 183, 184 and 185 disenable these devices, consequently, a logic 1 signal is present upon the output terminal thereof regardless of the logic signal applied to either or both of the other two input terminals. As the engine comes up to speed, the magnitude of the engine RPM potential level signal upon the output terminal of operational amplifier 67 of the double integrator circuit 37 of FIG. 3 is of a sufficient magnitude to produce base-emitter drive current through type NPN transistor 162, FIG. 5, to trigger this device conductive through the collector-emitter electrodes. With transistor 162 conducting, a logic 0 signal is present upon junction 163 which extinguishes transistor 165 and the "No Engine RPM Signal" indicator lamp 166 which indicates to the operator that primary signals are being produced by the engine and the test may proceed.

After the "No Engine RPM Signal" indicator lamp 166 of FIG. 5 has become extinguished, indicating that primary signals are being generated across the ignition distributor breaker contacts, the engine is accelerated to the selected speed of 600 RPM. With movable contact 81 of switch 80, FIG. 11, operated into electrical contact with stationary contact 80a, digital voltmeter 82 reads out directly in RPM, the engine speed. While the engine is being brought up to 600 RPM, the engine RPM potential signal upon the output terminal of operational amplifier 67 of the double integrator circuit 37 of FIG. 3 is less than 5.50 volts. Therefore, the magnitude of the engine RPM low reference potential signal applied to the negative input terminal of comparator 122 from the movable contact of potentiometer 133 through closed relay contact 137, and the magnitude of the engine RPM high reference potential signal, applied to the negative terminal of comparator 123 from the movable contact of potentiometer 131 and closed relay contact 138, are both greater than the magnitude of the engine RPM potential signal applied to the positive input terminal of both comparators 122 and 123. Consequently, a logic 0 signal appears upon the output terminal of each of comparators 122 and 123. The logic 0 signal upon the output terminal of comparator 122 is applied through circuit points 200(3) of FIG. 3 and 200(5) of FIG. 5 to the input terminal of NAND gate 202 and to one of the input terminals of each of NAND gates 169 and 170 and the logic 0 signal upon the output terminal of comparator 123 is applied through circuit points 201(3) of FIG. 3 and 201(5) of FIG. 5 to the input terminal of NAND gate 203 and one of the input terminals of NAND gate 170. As transistor 162 is conducting at this time, a logic 0 signal is present upon junction 163 and is applied to the input terminal of NAND gate 167. The logic 0 signal applied to the input terminal of each of NAND gates 167, 202 and 203 is inverted to a logic 1 signal upon the output terminal of each which are applied to respective input terminals of three-input NAND gate 168. The resulting logic 0 output signal of NAND gate 168 is inverted by NAND gate 171 to a logic 1 signal upon the output terminal thereof. This logic 1 signal produces base-emitter drive current for type NPN indicator lamp driver transistor 174 to trigger this device conductive through the collector-emitter electrodes to complete an energizing circuit for the "Engine RPM Low" indicator lamp 177 to illuminate this device indicating that the engine speed is less than the selected 600 RPM. As each of NAND gates 169 and 170 have a logic 0 signal upon one of the input terminals thereof, a logic 1 signal is present upon the output terminal of each. The logic 1 signal upon the output terminal of NAND gate 169 is inverted by NAND gate 172 to a logic 0 signal upon the output terminal thereof and the logic 1 signal upon the output terminal of NAND gate 170 is inverted by NAND gate 173 to a logic 0 signal upon the output terminal thereof. Consequently, base-emitter drive current is not supplied to either of type NPN indicator lamp driver transistors 175 or 176, consequently, the "Engine RPM In" indicator lamp 178 and the "Engine RPM High" indicator lamp 179 are not illuminated. The logic 1 signal upon the output terminal of NAND gate 169 is inverted by NAND gate 180 to a logic 0 signal upon the output terminal thereof which forward biases diode 181. With diode 181 forward biased, a logic 0 is present upon junction 182 which is applied to one of the input terminals of each of NAND gates 183, 184 and 185 to produce a logic 1 signal upon the output terminal of each of these NAND gates. These logic 1 signals are inverted by respective NAND gates 188, 189 and 190 to a logic 0 signal upon the output terminal of each. Consequently, base drive current is not supplied to type NPN indicator lamp driver transistors 191, 192 or 193, therefore, the "Time Retarded" indicator lamp 194, the "Time In" indicator lamp 195 and the "Time Advanced" indicator lamp 196 are not illuminated.

Should the engine speed be brought up beyond 650 RPM, the engine RPM potential level signal appearing upon the output terminal of operational amplifier 67 of the double integrator circuit 37 of FIG. 3 is greater than 6.50 volts. Therefore, the magnitude of the engine RPM low reference potential signal, applied to the negative input terminal comparator 122 and the magnitude of the engine RPM high reference potential signal applied to in the negative input terminal of comparator 123 are both less then the engine RPM potential signal, applied to the positive input terminal of both comparators 122 and 123. Therefore, a logic 1 signal appears upon the output terminal of each of comparators 122 and 123. The logic 1 signal upon the output terminal of comparator 122 is applied through circuitry previously described to the input terminal of NAND gate 202 and to one of the input terminals of each of NAND gates 169 and 170 and the logic 1 signal upon the output terminal of comparator 123 is applied through circuitry previously described to the input terminal of NAND gate 203 and one of the input terminals of NAND gate 170. As a logic 1 signal is still present upon the output terminal of NAND gate 167, a logic 1 signal is applied to each of the input terminals of NAND gate 170. The resulting logic 0 signal upon the output terminal of NAND gate 170 is inverted by NAND gate 173 to a logic 1 signal upon the output terminal thereof. This logic 1 signal produces base-emitter drive current for type NPN indicator lamp driver transistor 176 to trigger this device conductive through the collector-emitter electrodes to establish an energizing circuit for the "Engine RPM High" indicator lamp 179 to illuminate this device indicating that the engine speed is greater than the selected 600 RPM. As each of NAND gates 168 and 169 have a logic 0 signal upon one of the input terminals thereof, a logic 1 signal is present upon the output terminal of each. The logic 1 signal upon the output terminal of NAND gate 168 is inverted by NAND gate 171 to a logic 0 signal upon the output terminal thereof and the logic 1 signal present upon the output terminal of NAND gate 169 is inverted by NAND gate 172 to a logic 0 signal upon the output terminal thereof. Consequently, base-emitter drive current is not supplied to either of type NPN indicator lamp driver transistors 174 and 175, consequently, the "Engine RPM Low" indicator lamp 177 and the "Engine RPM In" lamp 178 are not illuminated. The logic 1 signal upon the output terminal of NAND gate 169 is inverted by NAND gate 180 to a logic 0 signal upon the output terminal thereof which forward biases diode 181. With diode 181 forward biased, a logic 0 signal is present upon junction 182. The logic 0 signal upon junction 182 maintains the "Time Retarded" indicator lamp 194, the "Time-In" indicator lamp 195 and the "Time Advanced" indicator lamp 196 extinguished for reasons previously set forth.

When the engine speed is adjusted to fall within the range of 550 to 650 RPM, the magnitude of the engine RPM potential signal upon the output terminal of operational amplifier 67 of the double integrator circuit 37 of FIG. 3 is between 5.50 and 6.50 volts. As this potential signal applied to the positive input terminal of comparator 122, is greater than the engine RPM low reference potential signal, applied to the negative input terminal of comparator 122, a logic 1 signal is present upon the output terminal of comparator 122 and since this potential signal, also applied to the positive input terminal of comparator 123, is less than the engine RPM high reference potential signal, applied to the negative input terminal of comparator 123, a logic 0 signal is present upon the output terminal of comparator 123. The logic 1 signal upon the output terminal of comparator 122 is applied through circuitry previously described to the input terminal of NAND gate 202 and to one of the input terminals of each of NAND gates 169 and 170 and the logic 0 signal present upon the output terminal of comparator 123 is applied through circuitry previously described to the input terminal of NAND gate 203 and one of the input terminals of NAND gate 170. As a logic 1 signal is still present upon the output terminal of NAND gate 167, a logic 1 signal is applied to each of the input terminals of NAND gate 169. The resulting logic 0 signal upon the output terminal of NAND gate 169 is inverted by NAND gate 172 to a logic 1 signal upon the output terminal thereof. This logic 1 signal produces base-emitter drive current for type NPN indicator lamp driver transistor 175 to trigger this device conductive through the collector-emitter electrodes to establish an energizing circuit for "Engine RPM In" indicator lamp 178 to illuminate this device indicating that the engine speed is within the tolerances of the selected 600 RPM. As each of NAND gates 168 and 170 have a logic 0 signal upon one of the input terminals thereof, a logic 1 signal appears upon the output terminal of each of these NAND gates. These logic 1 output signals are inverted by respective NAND gates 171 and 173 to logic 0 signals upon the output terminals thereof. As these logic 0 signals do not produce base-emitter drive current to respective type NPN indicator lamp driver transistors 174 and 176, the "Engine RPM Low" indicator lamp 177 and the "Engine RPM High" indicator lamp 179 are not illuminated. The logic 0 signal upon the output terminal of NAND gate 169 is inverted by NAND gate 180 to a logic 1 signal upon the output terminal thereof which reverse biases diode 181. However, that portion of the circuit responsive to the logic signal upon 182 remains disenabled should there be an improper TDC signal in a manner to be now explained.

From this description, it is apparent that the logic circuitry of FIG. 5 comprising NAND gates 202, 203, 167, 168, 169, 170, 171, 172 and 173 is responsive to a logic 1 output signal from both comparators 122 and 123 for producing a logic 1 "Engine RPM High" output signal upon the output terminal of NAND gate 173 indicating that the engine is operating at a speed greater than a selected engine speed; to a logic 0 output signal from both comparators 122 and 123 for producing a logic 1 "Engine RPM Low" output signal upon the output terminal of NAND gate 171 indicating that the engine is operating at a speed less than the selected engine speed and to a logic 1 output signal from comparator 123 and a logic 0 output signal from comparator 122 for producing a logic 1 "Engine RPM In" output signal upon the output terminal of NAND gate 172 indicating that the engine is operating at the selected engine speed.

Should the magnitude of the TDC potential signal appearing upon the output terminal of operational amplifier 53 of the double integrator circuit 36 of FIG. 3 be less than the magnitude of the TDC high and low reference potential signals applied to the negative input terminal of respective comparators 124 and 125 from the movable contact of potentiometer 129 and closed relay contacts 139 and from the movable contact of potentiometer 127 and closed relay contacts 140, respectively, a logic 0 signal appears upon the output terminal of each of comparators 124 and 125. The logic 0 signal upon the output terminal of comparator 124 is applied through circuit points 204(3) of FIG. 3 and 204(5) of FIG. 5 to the input terminal of NAND gate 206 of FIG. 5. This logic 0 signal is inverted by NAND gate 206 to a logic 1 signal upon the output terminal thereof which is applied to one of the input terminals of two-input NAND gate 207. The logic 0 signal upon the output terminal of comparator 125 is applied through circuit points 205(3) of FIG. 3 and 205(5) of FIG. 5 to the other input terminal of two-input NAND gate 207. The resulting logic 1 signal upon the output terminal of NAND gate 207 is inverted by NAND gate 208 to a logic 0 signal upon the output terminal thereof which is reinverted by NAND gate 209 to a logic 1 signal upon the output terminal thereof. The logic 1 signal upon the output terminal of NAND gate 209 produces base-emitter drive current for type NPN indicator lamp driver transistor 186 to trigger this device conductive through the collector-emitter electrodes to establish an energizing circuit for the "No TDC Signal" indicator lamp 187 to illuminate this device. The logic 0 signal upon the output terminal of NAND gate 208 forward biases diode 197, consequently, a logic 0 signal is present upon junction 182. With a logic 0 signal present upon junction 182, indicator lamps 194, 195 and 196 are not illuminated for reasons hereinabove set forth.

Should the magnitude of the TDC potential signal appearing upon the output terminal of operational amplifier 53 of FIG. 3 be greater than the magnitude of the TDC high and low reference potential signals applied to the negative input terminal of respective comparators 124 and 125, a logic 1 signal appears upon the output terminal of each of these comparators. The logic 1 signal upon the output terminal of comparator 124 is applied through circuitry previously described to the input terminal of NAND gate 206 of FIG. 5. This logic 1 signal is inverted by NAND gate 206 to a logic 0 signal upon the output terminal thereof which is applied to one of the input terminals of two-input NAND gate 207. The logic 1 signal present upon the output terminal of comparator 125 is applied through circuitry previously described to the other input terminal of two-input NAND gate 207. The resulting logic 1 signal upon the ouput terminal of NAND gate 207 is inverted by NAND gate 208 to a logic 0 signal upon the output terminal thereof which is reinverted by NAND gate 209 to a logic 1 signal upon the output terminal thereof. The logic 1 signal upon the output terminal of NAND gate 209 produces base-emitter drive current for type NPN indicator lamp driver transistor 186 to trigger this device conductive through the collector-emitter electrodes to establish an energizing circuit for the "No TDC Signal" indicator lamp 187 to illuminate this device. The logic 0 signal upon the output terminal of NAND gate 208 forward biases diode 197, consequently, a logic 0 signal is present upon junction 182. With a logic 0 signal present upon junction 182, indicator lamps 194, 195 and 196 are not illuminated for reasons hereinabove set forth.

Should the magnitude of the TDC potential signal appearing upon the output terminal of operational amplifier 53 of FIG. 3 be less than the magnitude of the TDC high reference potential signal applied to the negative input terminal of comparator 124 and greater than the magnitude of the TDC low reference potential signal applied to the negative polarity input terminal of comparator 125, a logic 0 signal appears upon the output terminal of comparator 124 and a logic 1 signal appears upon the output terminal of comparator 125. The logic 0 signal appearing upon the output terminal of comparator 124 is applied through circuitry previously described to the input terminal of NAND gate 206 and the logic 1 signal present upon the output terminal of comparator 125 is applied through circuitry previously described to one of the input terminals of two-input NAND gate 207. The logic 0 signal applied to input terminal of NAND gate 206 is inverted to a logic 1 signal upon the output terminal thereof which is applied to the other input terminal of two-input NAND gate 207. The resulting logic 0 signal upon the output terminal of NAND gate 207 is inverted by NAND gate 208 to a logic 1 signal upon the output terminal thereof which is reinverted by NAND gate 209 to a logic 0 signal upon the output terminal thereof. As the logic 0 signal upon the output terminal of NAND gate 209 does not produce base-emitter drive current for indicator lamp driver transistor 186, this device is extinguished and the "No TDC Signal indicator lamp 187 is not illuminated.

From this description, it is apparent that the logic circuitry of FIG. 5 comprising NAND gates 206, 207, 208 and 209 is responsive to a logic 1 output signal from both comparators 124 and 125 for producing a logic 1 output signal upon the output terminal of NAND gate 209 indicating that there are more TDC signals present than are required for the selected engine speed; to a logic 0 output signal from both comparators 124 and 125 for producing a logic 1 output signal upon the output terminal of NAND gate 209 indicating that there are fewer TDC signals present than are required for the selected engine speed and to a logic 0 output signal from comparator 124 and a logic 1 output signal from comparator 125 for producing a logic 0 output signal upon the output terminal of NAND gate 209 indicating that the proper number of TDC signals are present as required for the selected speed.

The logic 1 signal upon the output terminal of NAND gate 208 reverse biases diode 197. As diode 181 is also reverse biased by the logic 1 signal upon the output terminal of NAND gate 180 at this time, a logic 1 signal is present upon junction 182 which is applied to one of the input terminals of each of NAND gates 183, 184 and 185 to enable these devices.

The logic 1 signal present upon junction 182 produces base-emitter drive current for type NPN indicator lamp driver transistor 210 to trigger this device conductive through the collector-emitter electrodes to establish an energizing circuit for the "Test Ready" indicator lamp 211 to illuminate this device.

With the "No Engine Spark" indictor lamp 166 and the "No TDC Signal" indicator lamp 189 extinguished and the "Engine RPM In" indicator lamp 178 and the "Test Ready" indicator lamp 211 illuminated to indicate that the engine is operating at the selected speed of 600 RPM and that the ignition and TDC signals are present, the engine may be timed. Therefore, switch 154 of FIG. 4 is closed to establish an energizing circuit for operating coil 155 of relay 156 to operate relay contacts 157 and 158 to the electrical circuit closed condition. Movable contact 81 of switch 80 of FIG. 11 is operated into electrical contact with stationary contact 80d to connect the output terminal of operational amplifier 120 of FIG. 4 to the digital voltmeter 82 through circuit points 118(4) of FIG. 4 and 118(11) of FIG. 11. With this connection, the digital voltmeter 82 reads out directly in degrees the ignition spark advance or retard.

Should the ignition spark be advanced, the logic 0 signal maintained upon the output terminal of NAND gate 93 of FIG. 2 and applied, through circuit points 97(2) of FIG. 2 and 97(4) of FIG. 4, to the base electrode of type PNP transistor 101, maintains transistor 101 conductive to place junction 113 at substantially ground potential and each of the series of logic 0 timing angle signal pulses appearing upon the output terminal of NAND gate 91 of FIG. 2 and applied, through circuit points 96(2) of FIG. 2 and 96(4) of FIG. 4, to the base electrode of type NPN transistor 100, extinguishes transistor 100 during the width of each signal pulse to place junction 111 at a positive polarity potential with respect to junction 113 for the period of the width of each logic 0 timing angle signal pulse which results in a series of positive polarity pulses upon junction 111, each of a width the same as the corresponding timing angle signal pulse. This series of positive polarity pulses is averaged by the averager circuit of FIG. 4 to produce a timing angle potential signal of a positive polarity and of a magnitude proportional to the width of the timing angle signal pulses, the greater the average width, the greater the degree of ignition spark advance and the greater the mangitude of the timing angle potential signal.

Should the ignition spark be retarded, the logic 1 signal maintained upon the output terminal of NAND gate 91 of FIG. 2 and applied, through circuit points 96(2) of FIG. 2 and 96(4) of FIG. 4, to the base electrode of type PNP transistor 100, maintains transistor 100 conductive to place junction 112 at substantially ground potential and each of the series of logic 1 timing angle signal pulses appearing upon the output terminal of NAND gate 93 of FIG. 2 and applied, through circuit points 97(2) of FIG. 2 and 97(4) of FIG. 4, to the base electrode of type NPN transistor 101, extinguishes transistor 101 during the width of each signal pulse to place junction 111 at a negative polarity potential with respect to junction 112 for the period of the width of each logic 1 timing angle signal pulse which results in a series of negative polarity pulses upon junction 111, each of a width the same as the corresponding timing angle signal pulse. This series of negative polarity pulses is averaged by the averager circuit of FIG. 4 to produce a timing angle potential signal of a negative polarity and of a magnitude proportional to the width of the timing angle signal pulses, the greater the average width, the greater the degree of ignition spark advance and the greater the magnitude of the timing angle potential signal.

Should the magnitude of the timing angle potential signal upon the output terminal of operational amplifier 120, applied to the positive input terminal of both comparators 215 and 216, be less than the magnitude of the timing angle low and high reference potential signals applied, respectively, to the negative input terminal of operational amplifier 215 from the movable contact of potentiometer 150 through closed relay contact 157 and to the negative input terminal of comparator 216 from the movable contact of potentiometer 147 and closed relay contact 158, a logic 0 is present upon the ouput terminal of each of comparators 215 and 216. The logic 0 signal upon the output terminal of comparator 215 is applied through circuit points 220(4) of FIG. 4 and 220(5) of FIG. 5 to the input terminal of NAND gate 221 and one of the input terminals of each of three-input NAND gates 184 and 185 and the logic 0 signal upon the output terminal of comparator 216 is applied through circuit points 222(4) of FIG. 4 and 222(5) of FIG. 5 to the input terminal of NAND gate 223 and one of the input terminals of three-input NAND gate 185. The logic 0 signal applied to the input terminal of NAND gate 221 is inverted thereby to a logic 1 signal upon the output terminal thereof which is applied to one of the input terminals of three-input NAND gate 183 and the logic 0 signal upon the input terminal of NAND gate 223 is inverted thereby to a logic 1 signal upon the output terminal thereof which is applied to another input terminal of three-input NAND gate 183. At this time, three-input NAND gate 183 has a logic 1 signal upon each of the three-input terminals, consequently, a logic 0 signal is present upon the output terminal thereof which is inverted by NAND gate 188 to a logic 1 signal upon the output terminal thereof. This logic 1 signal produces base-emitter drive current to type NPN indicator lamp driver transistor 191 to trigger this device conductive through the collector-emitter electrodes to establish an energizing circuit for "Time Retarded" indicator lamp 194 to illuminate this device indicating that the engine timing is retarded. The number of degrees of ignition spark retard may be read directly from digital voltmeter 82. As each of three-input NAND gates 184 and 185 have a logic 0 signal upon at least one of the input terminals, a logic 1 signal is present upon the output terminal of each. These logic 1 signals are inverted by respective NAND gates 189 and 190 to a logic 0 signal upon the output terminal of each. As these logic 0 signals do not produce base-emitter drive current to indicator lamp driver transistors 192 and 193, these devices do not conduct through the collector-emitter electrodes and the respective "Time In" indicator lamp 195 and the "Time Advanced" indicator lamp 196 remain unilluminated.

Should the magnitude of the timing angle potential signal upon the output terminal of operational amplifier 120 be greater than the timing angle low and high reference potential signals applied to the negative input terminal of respective comparators 215 and 216, a logic 1 signal is present upon the output terminal of each of these comparators. The logic 1 signal upon the output terminal of comparator 215 is applied through circuitry previously described to the input terminal of NAND gate 221 and one of the input terminals of each of three-input NAND gates 184 and 185 and the logic 1 signal upon the output terminal of comparator 216 is applied through circuitry previously described to the input terminal of NAND gate 223 and to one of the input terminals of three-input NAND gate 185. At this time, NAND gate 185 has a logic 1 signal present upon each of the three input terminals, consequently, a logic 0 signal appears upon the output terminal thereof which is inverted by NAND gate 190 to a logic 1 signal upon the output terminal thereof. This logic 1 signal produces base-emitter drive current for type NPN indicator lamp driver transistor 193 to trigger this device conductive through the collector-emitter electrodes to establish an energizing circuit for the "Time Advanced" indicator lamp 196 to illuminate this device indicating that the engine time is advanced beyond the required 5°. As each of three-input NAND gates 183 and 184 have a logic 0 signal upon at least one of the input terminals, a logic 1 signal is present upon the output terminal of each. These logic 1 signals are inverted by respective NAND gates 188 and 189 to a logic 0 signal upon the output terminal of each. As these logic 0 signals do not produce base-emitter drive current for indicator lamp driver transistors 191 and 192, the "Time Retarded" indicator lamp 194 and the "Time In" indicator lamp 195 remain unilluminated.

If the engine ignition spark is retarded more than the selected 5° advance, the engine ignition distributor is revolved in the direction which will advance the ignition spark and if the ignition spark is advanced more than the selected 5° advance, the engine ignition distributor is revolved in the opposite direction to retard the ignition spark. In either event, when the timing angle potential signal upon the output terminal of operational amplifier 120 of FIG. 4 is of a magnitude between 4.8 and 5.2 volts, the magnitude of this signal, applied to the positive input terminal of comparators 215 and 216, is greater than the magnitude of the timing angle low reference potential signal applied to the negative input terminal of comparator 215 and is less than the magnitude of the timing angle high reference potential signal applied to the negative input terminal of comparator 216. Consequently, a logic 1 signal is present upon the output terminal of comparator 215 and a logic 0 signal is present upon the output terminal of comparator 216. The logic 1 signal upon the output terminal of comparator 215 is applied through circuitry previously described to the input terminal of NAND gate 221 of FIG. 5 and to one of the input terminals of each of three-input NAND gates 184 and 185 and the logic 0 signal upon the output terminal of comparator 216 is applied through circuitry previously described to the input terminal of NAND gate 223 of FIG. 5 and one of the input terminals of three-input NAND gate 185. The logic 1 signal upon the output terminal of comparator 215 is inverted by NAND gate 221 to a logic 0 signal on the output terminal thereof and applied to one of the input terminals of three-input NAND gate 183 and the logic 0 signal upon the output terminal of comparator 216 is inverted by NAND gate 223 to a logic 1 signal upon the output terminal thereof and applied to one of the input terminals of each of three-input NAND gates 183 and 184. At this time, a logic 1 signal is present upon each of the input terminals of three-input NAND gate 184, consequently, a logic 0 signal is present upon the output terminal thereof which is inverted by NAND gate 189 to a logic 1 signal upon the output terminal thereof. This logic 1 signal produces base-emitter drive current for type NPN indicator lamp driver transistor 192 which triggers this device conductive through the collector-emitter electrodes to establish an energizing circuit for "Time In" indicator lamp 195 to illuminate this device indicating that the engine ignition spark timing is at the required 5° advance. As each of three-input NAND gates 183 and 185 have a logic 0 signal upon at least one of the input terminals thereof, a logic 1 signal is present upon the output terminal of each. These logic 1 signals are inverted by respective NAND gates 188 and 190 to logic 0 signals upon the output of each. As these logic 0 signals do not supply base-emitter drive current for respective indicator lamp drive transistors 191 and 193, the "Time Retarded" indicator lamp 194 and the "Time Advanced" indicator lamp 196 are unilluminated.

From this description, it is apparent that the logic circuitry of FIG. 5 comprising NAND gates 221, 223, 183, 184, 185, 188, 189 and 190 is responsive to a logic 1 output signal from both comparators 215 and 216 for producing a logic 1 "Time Advanced" output signal upon the output terminal of NAND gate 190 indicating that the ignition spark is advanced; to a logic 0 output signal from both comparators 215 and 216 for producing a logic 1 "Time Retarded" output signal upon the output terminal of NAND gate 188 indicating that the ignition spark is retarded and to a logic 0 output signal from comparator 216 and a logic 1 output signal from comparator 215 for producing a logic 1 "Time In" output signal upon the output terminal of NAND gate 189 indicating that the engine is properly timed.

The preferred application of the internal combustion engine ignition timing instrument of this invention is in combination with a digital computer which is programmed to automatically time an internal combustion engine at a selected number of degrees of ignition spark advance or retard at each selected engine speed in response to the signals produced by the circuit of this invention. That is, the computer is programmed to select the speed or speeds at which the engine is to be timed by automatically closing switches, such as switch 134 of FIG. 3, to place the engine RPM high and low reference potential signals and the TDC high and low reference potential signals upon the proper input terminals of respective comparator circuits 123 and 122 and 124 and 125; is responsive to the logic 1 "Test Ready" signal upon junction 182 of FIG. 5 to operate a switch comparable to switch 154 of FIG. 4 to place the timing angle high and timing angle low reference potential signals for the number of degrees of ignition spark advance or retard at the selected engine RPM upon the proper input terminals of respective comparator circuits 216 and 215; is responsive to the logic 1 "Time Advanced" signal upon the output terminal of NAND gate 190 of FIG. 5 to supply a signal to associated control circuitry which operates a motor connected to the ignition distributor in the proper direction to retard the ignition timing; is responsive to the logic 1 "Time Retarded" signal upon the output terminal of NAND gate 188 of FIG. 5 to supply a signal to the associated control circuitry which operates the motor connected to the ignition distributor in the proper direction to advance the ignition spark and is responsive to the logic 1 "Time In" signal upon the output terminal of NAND gate 189 to conclude the test.

Another application of the instruments of this invention is with a human operator who observes the various indicator lamps of FIG. 5 and manually rotates the ignition distributor in the required direction to time the engine at the required number of degrees of ignition spark advance or retard at the selected engine speed.

That portion of the circuit of this invention set forth in FIG. 1 including operational amplifiers 24, 25 and 30, comparator circuits 32, 40 and 47 and the constructed RS flip-flop circuit is shown and described in detail in co-pending application Ser. No. 292,456, filed Sept. 25, 1972, and that portion set forth in FIG. 2 including J-K flip-flop circuits 88 and 89, NAND gates 90, 91 and 92 and monostable multivibrators 94 and 95 is shown and described in detail in co-pending application Ser. No. 292,266, filed Sept. 25, 1972.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An internal combustion engine ignition timing instrument comprising: means for producing a primary signal each time an ignition spark is generated for said engine; means for producing a TDC signal when the reference cylinder of said engine is at the top dead center position; circuit means responsive to said primary signals for producing an ignition signal when an ignition spark potential is generated for the reference cylinder of said engine; circuit means responsive to said TDC and ignition signals for producing a series of timing angle signal pulses each of a width equal to the period between said TDC and ignition signals when the ignition spark is retarded and to the period between said ignition and TDC signals when the ignition spark is advanced; circuit means responsive to said timing angle signal pulses for producing a direct current timing angle potential signal of a selected one polarity when the ignition spark is retarded and of the opposite polarity when the ignition spark is advanced and of a magnitude porportional to the number of degrees of ignition spark retard or advance; means for producing a direct current timing angle high reference potential signal and a direct current timing angle low reference potential signal of selected respective magnitudes greater than and less than the magnitude of said timing angle potential signal at a selected number of degrees of ignition spark retard or advance; first circuit means responsive to said timing angle potential signal and said timing angle high reference potential signal for producing a logic output signal of a selected polarity when the magnitude of said timing angle potential signal is greater than and a logic output signal of another polarity when the magnitude of said timing angle potential signal is less than the magnitude of said timing angle high reference potential signal; second circuit means responsive to said timing angle potential signal and said timing angle low reference potential signal for producing a logic output signal of a selected polarity when the magnitude of said timing angle potential signal is greater than and a logic output signal of another polarity when the magnitude of said timing angle potential signal is less than the magnitude of said timing angle low reference potential signal, and logic circuit means responsive to a logic output signal of said selected polarity from both said first and second circuit means for producing a logic output signal of a selected polarity indicating that the ignition spark is advanced; to a logic output signal of said other polarity from both said first and second circuit means for producing a logic output signal of a selected polarity indicating that the ignition spark is retarded and to a logic output signal of said selected polarity from said first circuit means and a logic output signal of said other polarity from said second circuit means for producing a logic output signal of a selected polarity indicating that the engine is properly timed.

2. An internal combustion engine ignition timing instrument comprising: means for producing a primary signal each time an ignition spark is generated for said engine; means for producing a TDC signal when the reference cylinder of said engine is at the top dead center position; circuit means responsive to said primary signals for producing an ignition signal when an ignition spark potential is generated for the reference cylinder of said engine; circuit means responsive to said TDC and ignition signals for producing a series of timing angle signal pulses each of a width equal to the period between said TDC and ignition signals when the ignition spark is retarded and to the period between said ignition and TDC signals when the ignition spark is advanced; circuit means responsive to said timing angle signal pulses for producing a direct current timing angle potential signal of a selected one polarity when the ignition spark is retarded and of the opposite polarity when the ignition spark is advanced and of a magnitude proportional to the number of degrees of ignition spark retard or advance; means for producing a direct current timing angle high reference potential signal nad a direct current timing angle low reference potential signal of selected respective magnitudes greater than and less than the magnitude of said timing angle potential signal at a selected number of degrees of ignition spark retard or advance; first circuit means responsive to said timing angle potential signal and said timing angle high reference potential signal for producing a logic output signal of a selected polarity when the magnitude of said timing angle potential signal is greater than and a logic output signal of another polarity when the magnitude of said timing angle potential signal is less than the magnitude of said timing angle high reference potential signal; second circuit means responsive to said timing angle potential signal and said timing angle low reference potential signal for producing a logic output signal of a selected polarity when the magnitude of said timing angle potential signal is greater than and a logic output signal of another polarity when the magnitude of said timing angle potential signal is less than the magnitude of said timing angle low reference potential signal, and logic circuit means responsive to a logic output signal of said selected polarity from both said first and second circuit means for producing a logic output signal of a selected polarity upon a first output terminal indicating that the ignition spark is advanced; to a logic output signal of said other polarity from both said first and second circuit means for producing a logic output signal of a selected polarity puon a second output terminal indicating that the ignition spark is retarded and to a logic output signal of said selected polarity from said first circuit means and a logic output of said other polarity signal from said second circuit means for producing a logic output signal of a selected polarity upon a third output terminal indicating that the engine is properly timed.

3. An internal combustion engine ignition timing instrument comprising: means for producing a primary signal each time an ignition spark is generated for said engine; means for producing a TDC signal when the reference cylinder of said engine is at the top dead center position; circuit means responsive to said primary signals for producing an ignition signal when an ignition spark potential is generated for the reference cylinder of said engine; circuit means responsive to said TDC and ignition signals for producing a series of timing angle signal pulses each of a width equal to the period between said TDC and ignition signals when the ignition spark is retarded and to the period between said ignition and TDC signals when the ignition spark is advanced; circuit means responsive to said timing angle signal pulses for producing a direct current timing angle potential signal of a selected one polarity when the ignition spark is retarded and of the opposite polarity when the ignition spark is advanced and of a magnitude proportional to the number of degrees of ignition spark retard or advance, means for producing a direct current timing angle high reference potential signal and a direct current timing angle low reference potential signal of selected respective magnitudes greater than and less than the magnitude of said timing potential signal at a selected number of degrees of ignition spark retard or advance; a first comparator circuit responsive to said timing angle potential signal and said timing angle high reference potential signal for producing a logic output signal of a selected polarity when the magnitude of said timing angle potential signal is greater than and a logic output signal of another polarity when the magnitude of said timing angle potential signal is less than the magnitude of said timing angle high reference potential signal; a second comparator circuit responsive to said timing angle potential signal and said timing angle low reference potential signal for producing a logic output signal of a selected polarity when the magnitude of said timing angle potential signal is greater than and a logic output signal of another polarity when the magnitude of said timing angle potential signal is less than the magniutde of said timing angle low reference potential signal, and logic circuit means responsive to a logic output signal of said selected polarity from both said first and second comparator circuits for producing a logic output signal of a selected polarity upon a first output terminal indicating that the ignition spark is advanced; to a logic output signal of said other polarity from both said first and second comparator circuits for producing a logic output signal of a selected polarity upon a second output terminal indicating that the ignition spark is retarded and to a logic output signal of said selected polarity from said first comparator circuit and a logic output signal of said other polarity from said second comparator circuit for producing a logic output signal of a selected polarity upon a third output terminal indicating that the engine is properly timed.

4. An internal combustion engine ignition timing instrument comprising: means for producing a primary signal each time an ignition spark is generated for said engine; means for producing a TDC signal when the reference cylinder of said engine is at the top dead center position; circuit means comprising a counter circuit and a NAND gate having an output terminal responsive to said primary signals for producing an ignition signal upon said output terminal of said NAND gate when an ignition spark potential is generated for the reference cylinder of said engine; circuit means responsive to said TDC and ignition signals for producing a series of timing angle signal pulses each of a width equal to the period between said TDC and ignition signals when the ignition spark is retarded and to the period between said ignition and TDC signals when the ignition spark is advanced; circuit means responsive to said timing angle signal pulses for producing a direct current timing angle potential signal of a selected one polarity when the ignition spark is retarded and of the opposite polarity when the ignition spark is advanced and of a magnitude proportional to the number of degrees of ignition spark retard or advance; means for producing a direct current timing angle high reference potential signal and a direct current timing angle low reference potential signal of selected respective magnitudes greater than and less than the magnitude of said timing angle potential signal at a selected number of degrees of ignition spark retard or advance; first comparator circuit means responsive to said timing angle potential signal and said timing angle high reference potential signal for producing a logic output signal of a selected polarity when the magnitude of said timing angle potential signal is greater than and a logic output signal of another polarity when the magnitude of said timing angle potential signal is less than the magnitude of said timing angle high reference potential signal; second comparator circuit means responsive to said timing angle potential signal and said timing angle low reference potential signal for producing a logic output signal of a selected polarity when the magnitude of said timing angle potential signal is greater than and a logic output signal of another polarity when the magnitude of said timing angle potential signal is less than the magnitude of said timing angle low reference potential signal, and logic circuit means responsive to a logic output signal of said selected polarity from both said first and second comparator circuits for producing a logic output signal of a selected polarity upon a first output terminal indicating that the ignition spark is advanced; to a logic output signal of said other polarity from both said first and second comparator circuits for producing a logic output signal of a selected polarity upon a second output terminal indicating that the ignition spark is retarded and to a logic output signal of said selected polarity from said first comparator circuit and a logic output signal of said other polarity from said second comparator circuit for producing a logic output signal of a selected polarity upon a third output terminal indicating that the engine is properly timed.

5. An internal combustion engine ignition timing instrument comprising: means for producing a primary signal each time an ignition spark is generated for said engine; means for producing a TDC signal when the reference cylinder of said engine is at the top dead center position; a counter circuit having an input terminal and output terminals, a NAND gate having a plurality of input terminals and an output terminal, means for applying said primary signals to said input terminal of said counter circuit and to one of said input terminals of said NAND gate and means for connecting each said output terminal of said counter circuit to a respective one input terminal of said NAND gate whereby said counter circuit and said NAND gate are responsive to said primary signals for producing an ignition signal upon said output terminal of said NAND gate when an ignition spark potential is generated for the reference cylinder of said engine; first and second J-K flip-flops each having a clock input and a Q and $\bar{Q}$ output terminals, first and second NAND gates each having two input terminals and an output terminal, a third NAND gate having an input terminal and an output terminal, means for applying said ignition signal to said clock input terminal of one of said J-K flip-flops and said TDC signals to said clock input terminal of the other one of said J-K flip-flops and means for connecting said Q output terminal of one of said J-K flip-flops and said $\bar{Q}$ output terminal of the other one of said J-K flip-flop to respective said input terminals of one of said first and second NAND gates and said Q output terminal of said other one of said J-K flip-flops and said $\bar{Q}$ output of said one of said J-K flip-flops to respective said input terminals of the other one of said first and second NAND gates and said output terminal of one of said first and second NAND gates to said input terminal of said third NAND gate whereby said J-K flip-flops and said NAND gates are responsive to said TDC and ignition signals for producing a series of timing angle signal pulses each of a width equal to the period between said TDC and ignition signals when the ignition spark is retarded and to the period between said ignition and TDC signals when the ignition spark is advanced; an averager circuit responsive to said timing angle signal pulses for producing a direct current timing angle potential signal of a selected one polarity when the ignition spark is retarded and of the opposite polarity when the ignition spark is advanced and of a magnitude proportional to the number of degrees of ignition spark retard or advance; means for producing a direct current timing angle high reference potential signal and a direct current timing angle low reference potential signal of selected respective magnitudes greater than and less than the magnitude of said timing angle potential signal at a selected number of degrees of ignition spark retard or advance; first comparator circuit means responsive to said timing angle potential signal and said timing angle high reference potential signal for producing a logic output signal when the magnitude of said timing angle potential signal is greater than and a logic output signal when the magnitude of said timing angle potential signal is less than the magnitude of said timing angle high reference potential signal; second comparator circuit means responsive to said timing angle potential signal and said timing angle low reference potential signal for producing a logic output signal when the magnitude of said timing angle potential signal is greater than and a logic output signal when the magnitude of said timing angle potential signal is less than the magnitude of said timing angle low reference potential signal, and logic circuit means responsive to a logic output signal from both said first and second comparator circuits for producing a logic output signal upon a first output terminal indicating that the ignition spark is advanced; to a logic output signal from both said first and second comparator circuits for producing a logic output signal upon a second output terminal indicating that the ignition spark is retarded and to a logic output signal from said first comparator circuit and a logic output signal from said second comparator circuit for producing a logic output signal upon a third output terminal indicating that the engine is properly timed.

6. An internal combustion engine ignition timing instrument comprising: means for producing a primary signal each time an ignition spark is generated for said engine; means for producing a TDC signal when the reference cylinder of said engine is at the top dead center position; circuit means responsive to said primary signals for producing a direct current engine RPM potential signal of a magnitude proportional to engine speed; circuit means responsive to said primary signals for producing an ignition signal when an ignition spark potential is generated for the reference cylinder of said engine; circuit means responsive to said TDC and ignition signals for producing a series of timing angle signal pulses each of a width equal to the period between said TDC and ignition signals when the ignition spark is retarded and to the period between said ignition and TDC signals when the ignition spark is advanced; circuit means responsive to said timing angle signal pulses for producing a direct current timing angle potential signal of a selected one polarity when the ignition spark is retarded and of the opposite polarity when the ignition spark is advanced of a magnitude proportional to the number of degrees of ignition spark retard or advance; means for producing a direct current engine RPM high reference potential signal and a direct current engine RPM low reference potential signal of selected respective magnitudes greater than and less than the magnitude of said enging RPM potential signal at a selected engine speed; first circuit means responsive to said engine RPM potential signal and said engine RPM high reference potential signal for producing a logic output signal when the magnitude of said engine RPM potential signal is greater than and a logic output signal when the magnitude of said enginge RPM potential signal is less than the magnitude of said engine RPM high reference potential signal; second circuit means responsive to said engine RPM potential signal and said engine RPM low reference potential signal for producing a logic output signal when the magnitude of said engine RPM potential signal is greater than and a logic output signal when the magnitude of said engine RPM potential signal is less than the magnitude of said engine RPM low reference potential signal; means for producing a direct current timing angle high reference potential signal and a direct current timing angle low reference potential signal of selected respective magnitudes greater than and less than the magnitude of said timing angle potential signal at a selected number of degrees of ignition spark retard or advance; third circuit means responsive to said timing angle potential signal and said timing angle high reference potential signal for producing a logic output signal when the magnitude of said timing angle potential signal is greater than and a logic output signal when the magnitude of said timing angle potential signal is less than the magnitude of said timing angle high reference potential signal; fourth circuit means responsive to said timing angle potential signal and said timing angle low reference potential signal for producing a logic output signal when the magnitude of said timing angle potential signal is greater than and a logic output signal when the magnitude of said timing angle potential signal is less than the magnitude of said timing angle low reference potential signal; logic circuit means responsive to a logic output signal from both said first and second circuit means for producing a logic output signal indicating that the engine is operating at a speed greater than a selected engine speed; to a logic output signal from both said first and second circuit means for producing a logic output signal indicating that the engine is operating at a speed less than the selected engine speed and to a logic output signal from said first circuit means and a logic output signal from said second circuit means for producing a logic output signal indicating that the engine is operating at the selected engine speed; and logic circuit means responsive to a logic output signal from both said third and fourth circuit means for producing a logic output signal indicating that the ignition spark is advanced; to a logic output signal from both said third and fourth circuit means for producing a logic output signal indicating that the ignition spark is retarded and to a logic output signal from said third circuit means and a logic output signal from said fourth circuit means for producing a logic output signal indicating that the engine is properly timed.

7. An internal combustion engine ignition timing instrument comprising: means for producing a primary signal each time an ignition spark is generated for said engine; means for producing a TDC signal when the reference cylinder of said engine is at the top dead center position; circuit means responsive to said primary signals for producing a direct current engine RPM potential signal of a magnitude proportional to engine speed; circuit means responsive to said primary signals for producing an ignition signal when an ignition spark potential is generated for the reference cylinder of said engine; circuit means responsive to said TDC and ignition signals for producing a series of timing angle signal pulses each of a width equal to the period between sadi TDC and ignition signals when the ignition spark is retarded and to the period between said ignition and TDC signals when the ignition spark is advanced; circuit means responsive to said timing angle signal pulses for producing a direct current timing angle potential signal of a selected one polarity when the ignition spark is retarded and of the opposite polarity when the ignition spark is advanced and of a magnitude proportional to the number of degrees of ignition spark retard or advance; means for producing a direct current engine RPM high reference potential signal and a direct current engine RPM low reference potential signal of selected respective magnitudes greater than and less than the magnitude of said engine RPM potential signal at a selected engine speed; first circuit means responsive to said engine RPM potential signal and said engine RPM high reference potential signal for producing a logic output signal when the magnitude of said engine RPM potential signal is greater than and a logic output signal when the magnitude of said engine RPM potential signal is less than the magnitude of said engine RPM high reference potential signal; second circuit means responsive to said engine RPM potential signal and said engine RPM low reference potential signal for producing a logic output signal when the magnitude of said engine RPM potential signal is greater than and a logic output signal when the magnitude of said engine RPM potential signal is less than the magnitude of said engine RPM low reference potential signal; means for producing a direct current timing angle high reference potential signal and a direct current timing angle low reference potential signal of selected respective magnitudes greater than and less than the magnitude of said timing angle potential signal at a selected number of degrees of ignition spark retard or advance; third circuit means responsive to said timing angle potential signal and said timing angle high reference potential signal for producing a logic output signal when the magnitude of said timing angle potential signal is greater than and a logic output signal when the magnitude of said timing angle potential signal is less than the magnitude of said timing angle high reference potential signal; fourth circuit means responsive to said timing angle potential signal and said timing angle low reference potential signal for producing a logic output signal when the magnitude of said timing angle potential signal is greater than and a logic output signal when the magnitude of said timing angle potential signal is less than the magnitude of said timing angle low reference potential signal, logic circuit means responsive to a logic output signal from both said first and second circuit means for producing a logic output signal upon a first output terminal thereof indicating that the engine is operating at a speed greater than a selected engine speed; to a logic output signal from both said first and second circuit means for producing a logic output signal upon a second output terminal thereof indicating that the engine is operating at a speed less than the selected engine speed and to a logic output signal from said first circuit means and a logic output signal from said second circuit means for producing a logic output signal upon a third output terminal thereof indicating that the engine is operating at the selected engine speed; and logic circuit means responsive to a logic output signal from both said third and fourth circuit means for producing a logic output signal upon a first output terminal thereof indicating that the ignition spark is advanced; to a logic output signal from both said third and fourth circuit means for producing a logic output signal upon a second output terminal thereof indicating that the ignition spark is retarded and to a logic output signal from said third circuit means and a logic output signal from said fourth circuit means for producing a logic output signal upon a third output terminal thereof indicating that the engine is properly timed.

8. An internal combustion engine ignition timing instrument comprising: means for producing a primary signal each time an ignition spark is generated for said engine; means for producing a TDC signal when the reference cylinder of said engine is at the top dead center position; first circuit means responsive to said primary signals for producing a direct current engine RPM potential signal of a magnitude proportional to engine speed; second circuit means responsive to said primary signals for producing an ignition signal when an ignition spark potential is generated for the reference cylinder of said engine; circuit means responsive to said TDC and ignition signals for producing a series of timing angle signal pulses each of a width equal to the period between said TDC and ignition signals when the ignition spark is retarded and to the period between said ignition and TDC signals when the ignition spark is advanced; circuit means responsive to said timing angle signal pulses for producing a direct current timing angle potential signal of a selected one polarity when the ignition spark is retarded and of the opposite polarity when the ignition spark is advanced and of a magnitude proportional to the number of degrees of ignition spark retard or advance; means for producing a direct current engine RPM high reference potential signal and a direct current engine RPM low reference potential signal of selected respective magnitudes greater than and less than the magnitude of said engine RPM potential signal at a selected engine speed; a first comparator circuit responsive to said engine RPM potential signal and said engine RPM high reference potential signal for producing a logic output signal when the magnitude of said engine RPM potential signal is greater than and a logic output signal when the magnitude of said engine RPM potential signal is less than the magnitude of said engine rpm high reference potential signal; a second comparator circuit responsive to said engine RPM potential signal and said engine RPM low reference potential signal for producing a logic output signal when the magnitude of said engine RPM potential signal is greater than and a logic output signal when the magnitude of said engine RPM potential signal is less than the magnitude of said engine RPM low reference potential signal; means for producing a direct current timing angle high reference potential signal and a direct current timing angle low reference potential signal of selected respective magnitudes greater than and less than the magnitude of said timing angle potential signal at a selected number of degrees of ignition spark retard or advance; a third comparator circuit responsive to said timing angle potential signal and said timing angle high reference potential signal for producing a logic output signal when the magnitude of said timing angle potential signal is greater than and a logic output signal when the magnitude of said timing angle potential signal is less than the magnitude of said timing angle high reference potential signal; a fourth comparator circuit responsive to said timing angle potential signal and said timing angle low reference potential signal for producing a logic output signal when the magnitude of said timing angle potential signal is greater than and a logic output signal when the magnitude of said timing angle potential signal is less than the magnitude of said timing angle low reference potential signal, logic circuit means responsive to a logic output signal from both said first and second comparator circuits for producing a logic output signal upon a first output terminal thereof indicating that the engine is operating at a speed greater than a selected engine speed; to a logic output signal from both said first and second comparator circuits for producing a logic output signal upon a second output terminal thereof indicating that the engine is operating at a speed less than the selected engine speed and to a logic output signal from said first comparator circuit and a logic output signal from said first comparator circuit for producing a logic output signal upon a third output terminal thereof indicating that the engine is operating at the selected engine speed; and logic circuit means responsive to a logic output signal from both said third and fourth comparator circuits for producing a logic output signal upon a first output terminal thereof indicating that the ignition spark is advanced; to a logic output signal from both said third and fourth comparator circuits for producing a logic output signal upon a second output terminal thereof indicating that the ignition spark is retarded and to a logic output signal from said third comparator circuit and a logic output signal from said fourth comparator circuit for producing a logic output signal upon a third output terminal thereof indicating that the engine is properly timed.

9. An internal combustion engine ignition timing instrument comprising: means for producing a primary signal each time an ignition spark is generated for said engine; means for producing a TDC signal when the reference cylinder of said engine is at the top dead center position; first circuit means responsive to said primary signals for producing a direct current engine RPM potential signal of a magnitude proportional to engine speed; circuit means comprising a counter circuit and a NAND gate having an output terminal responsive to said primary signals for producing an ignition signal upon said output terminal of said NAND gate when an ignition spark potential is generated for the reference cylinder of said engine; circuit means responsive to said TDC and ignition signals for producing a series of timing angle signal pulses each of a width equal to the period between said TDC and ignition signals when the ignition spark is retarded and to the period between said ignition and TDC signal when the ignition spark is advanced; circuit means responsive to said timing angle signal pulses for producing a direct current timing angle potential signal of a selected one polarity when the ignition spark is retarded and of the opposite polarity when the ignition spark is advanced and of a magnitude proportional to the number of degrees of ignition spark retard or advance; means for producing a direct current engine RPM high reference potential signal and a direct current engine RPM low reference potential signal of selected respective magnitudes greater than and less than the magnitude of said engine RPM potential signal at a selected engine speed; a first comparator circuit responsive to said engine RPM potential signal and said engine RPM high reference potential signal for producing a logic output signal when the magnitude of said engine RPM potential signal is greater than and a logic output signal when the magnitude of said engine RPM potential signal is less than the magnitude of said engine RPM high reference potential signal; a second comparator circuit responsive to said engine RPM potential signal and said engine RPM low reference potential signal for producing a logic output signal when the magnitude of said engine RPM potential signal is greater than and a logic output signal when the magnitude of said engine RPM potential signal is less than the magnitude of said engine RPM low reference potential signal; means for producing a direct current timing angle high reference potential signal and a direct current timing angle low reference potential signal of selected respective magnitudes greater than and less than the magnitude of said timing angle potential signal at a selected number of degrees of ignition spark retard or advance; a third comparator circuit responsive to said timing angle potential signal and said timing angle high reference potential signal for producing a logic output signal when the magnitude of said timing angle potential signal is greater than and a logic output signal when the magnitude of said timing angle potential signal is less than the magnitude of said timing angle high reference potential signal; a fourth comparator circuit responsive to said timing angle potential signal and said timing angle low reference potential signal for producing a logic output signal when the magnitude of said timing angle potential signal is greater than and a logic output signal when the magnitude of said timing angle potential signal is less than the magnitude of said timing angle low reference potential signal, logic circuit means responsive to a logic output signal from both said first and second comparator circuits for producing a logic output signal upon a first output terminal thereof indicating that the engine is operating at a speed greater than a selected engine speed; to a logic output signal from both said first and second comparator circuits for producing a logic output signal upon a second output terminal thereof indicating that the engine is operating at a speed less than the selected engine speed and to a logic output signal from said first comparator circuit and a logic output signal from said second comparator circuit for producing a logic output signal upon a third output terminal thereof indicating that the engine is operating at the selected engine speed; and lgoic circuit means responsive to a logic output signal from both said third and fourth comparator circuits for producing a logic output signal upon a first output terminal thereof indicating that the ignition spark is advanced; to a logic output signal from both said third and fourth comparator circuits for producing a logic ootput signal upon a second output terminal thereof indicating that the ignition spark is retarded and to a logic output signal from said third comparator circuit and a logic output signal from said fourth comparator circuit for producing a logic output signal upon a third output terminal thereof indicating that the engine is properly timed.

10. An internal combustion engine ignition timing instrument comprising: means for producing a primary signal each time an ignition spark is generated for said engine; means for producing a TDC signal when the reference cylinder of said engine is at the top dead center position; an integrator circuit responsive to said primary signals for producing a direct current engine RPM potential signal of a magnitude proportional to engine speed; a counter circuit having an input terminal and output terminals, a NAND gate having a plurality of input terminals and an output terminal, means for applying said primary signals to said input terminal of said counter circuit and to one of said input terminals of said NAND gate and means for connecting each said output terminal of said counter circuit to a respective one input terminal of said NAND gate whereby said counter circuit and said NAND gate are responsive to said primary signals for producing an ignition signal upon said output terminal of said NAND gate when an ignition spark potential is generated for the reference cylinder of said engine; first and second J-K flip-flops each having a clock input and a Q and $\bar{Q}$ output terminals, first and second NAND gates each having two input terminals and an output terminal, and third NAND gate having an input terminal and an output terminal, means for applying said ignition signals to said clock input terminal of one of said J-K flip-flops and said TDC signals to said clock input terminal of the other one of said J-K flip-flops and means for connecting said Q output terminal of one of said J-K flip-flops and said $\bar{Q}$ output terminal of the other one of said J-K flip-flops to respective and said input terminals of one of said first and second NAND gates and said Q output terminal of said other one of said J-K flip-flops and said $\bar{Q}$ output of said one of said J-K flip-flops to respective said input terminals of the other one of said first and second NAND gates and said output terminal of one of said first and second NAND gates to said input terminal of said third NAND gate whereby said J-K flip-flops and said NAND gates are responsive to said TDC and ignition signals for producing a series of timing angle signal pulses each of a width equal to the period between said TDC and ignition signals when the ignition spark is retarded and to the period between said ignition and TDC signals when the ignition spark is advanced; an averager circuit responsive to said timing angle signal pulses for producing a direct current timing angle potential signal of a selected one polarity when the ignition spark is retarded and of the opposite polarity when the ignition spark is advanced and of a magnitude proportional to the number of degrees of ignition spark retard or advance; means for producing a direct current engine RPM high reference potential signal and a direct current engine RPM low reference potential signal of selected respective magnitudes greater than and less than the magnitude of said engine RPM potential signal at a selected engine speed; a first comparator circuit responsive to said engine RPM potential signal and said engine RPM high reference potential signal for producing a logic output signal when the magnitude of said engine RPM potential signal is greater than and a logic output signal when the magnitude of said engine RPM potential signal is less than the magnitude of said engine RPM high reference potential signal; a second comparator circuit responsive to said engine RPM potential signal and said engine RPM low reference potential signal for producing a logic output signal when the magnitude of said engine RPM potential signal is greater than and a logic output signal when the magnitude of said engine RPM potential signal is less than the magnitude of said engine RPM low reference potential signal; means for producing a direct current timing angle high reference potential signal and a direct current timing angle low reference potential signal of selected respective magnitudes greater than and less than the magnitude of said timing angle potential signal at a selected number of degrees of ignition spark retard or advance; a third comparator circuit responsive to said timing angle potential signal and said timing angle high reference potential signal for producing a logic output signal when the magnitude of said timing angle potential signal is greater than and a logic output signal when the magnitude of said timing angle potential signal is less than the magnitude of said timing angle high reference potential signal; a fourth comparator circuit responsive to said timing angle potential signal and said timing angle low reference potential signal for producing a logic output signal when the magnitude of said timing angle potential signal is greater than and a logic output signal when the magnitude of said timing angle potential signal is less than the magnitude of said timing angle low reference potential signal, logic circuit means responsive to a logic output signal from both said first and second comparator circuits for producing a logic output signal upon a first output terminal thereof indicating that the engine is operating at a speed greater than a selected engine speed; to a logic output signal from both said first and second comparator circuits for producing a logic output signal upon a second output terminal thereof indicating that the engine is operating at a speed less than the selected engine speed and to a logic output signal from said first comparator circuit and a logic output signal from said second comparator circuit for producing a logic output signal upon a third output terminal thereof indicating that the engine is operating at the selected engine speed; and logic circuit means responsive to a logic output signal from both said third and fourth comparator circuits for producing a logic output signal upon a first output terminal thereof indicating that the ignition spark is advanced; to a logic output signal from both said third and fourth comparator circuits for producing a logic output signal upon a second output terminal thereof indicating that the ignition spark is retarded and to a logic output signal from said third comparator circuit and a logic output signal from said fourth comparator circuit for producing a logic output signal upon a third output terminal thereof indicating that the engine is properly timed.

* * * * *

PO-1050
(5/69)

UNITED STATES PATENT OFFICE
CERTIFICATE OF CORRECTION

Patent No. 3,775,672   Dated November 27, 1973

Inventor(s) Vincent H. Letosky

It is certified that error appears in the above-identified patent and that said Letters Patent are hereby corrected as shown below:

Col. 4, line 7, "corss-over" should read -- cross-over --. Col. 6, line 13, "331D" should read -- 311D --. Col. 11, line 44, "rest" should read -- reset --. Col. 12, line 32, after "logic" insert -- 0 --. Col. 13, line 7, "TCD" should read -- TDC --. Col. 15, line 36, after "potential" insert -- signal-- line 45, "3293/14" should read -- 3292/14 --. Col. 16, line 66, after "550" insert -- engine --. Col. 17, line 13, "139" should read -- 129 --. Col. 18, line 54, "now" should read -- not --. Col. 25, line 25, "mangitude" should read -- magnitude --. Col. 30, line 14, "nad" should read -- and --; line 43, "puon" should read -- upon --. Col. 34, line 8, "enging" should read -- engine --; line 14, "enginge" should read -- engine --. Col. 35, line 12, "sadi" should read -- said --. Col. 37, line 29, "first" should read -- second --. Col. 38, line 58, "lgoic" should read -- logic --; line 64, "ootput" should read -- output-- Col. 39, line 27, "and" (second occurrence) should read -- a --; line 35, delete "and".

Signed and sealed this 13th day of August 1974.

(SEAL)
Attest:

McCOY M. GIBSON, JR.
Attesting Officer

C. MARSHALL DANN
Commissioner of Patents